US009224540B2

(12) United States Patent
Takeda et al.

(10) Patent No.: US 9,224,540 B2
(45) Date of Patent: Dec. 29, 2015

(54) CONDUCTIVE POLYMER FOR SOLID ELECTROLYTE CAPACITOR

(71) Applicant: Plextronics, Inc., Pittsburgh, PA (US)

(72) Inventors: Takuma Takeda, Higashiyama-ku (JP);
Koichi Mori, Higashiyama-ku (JP);
Bunpei Yoshida, Higashiyama-ku (JP)

(73) Assignee: SOLVAY USA, INC., Cranbury, NJ (US)

( * ) Notice: Subject to any disclaimer, the term of this patent is extended or adjusted under 35 U.S.C. 154(b) by 20 days.

(21) Appl. No.: 13/903,864

(22) Filed: May 28, 2013

(65) Prior Publication Data

US 2014/0014881 A1    Jan. 16, 2014

(30) Foreign Application Priority Data

May 29, 2012    (JP) .................. 2012-121549

(51) Int. Cl.
| | | |
|---|---|---|
| *H01B 1/12* | (2006.01) | |
| *H01G 9/042* | (2006.01) | |
| *H01G 9/025* | (2006.01) | |
| *C08G 61/12* | (2006.01) | |
| *C08L 65/00* | (2006.01) | |
| *H01G 9/028* | (2006.01) | |
| *H01G 9/15* | (2006.01) | |

(52) U.S. Cl.
CPC .............. *H01G 9/042* (2013.01); *C08G 61/126* (2013.01); *C08L 65/00* (2013.01); *H01B 1/122* (2013.01); *H01B 1/127* (2013.01); *H01G 9/028* (2013.01); *H01G 9/15* (2013.01); *C08G 2261/1424* (2013.01); *C08G 2261/1452* (2013.01); *C08G 2261/3223* (2013.01); *C08G 2261/516* (2013.01); *C08G 2261/722* (2013.01); *C08G 2261/90* (2013.01)

(58) Field of Classification Search
CPC ....... H01G 9/042; H01G 9/025; C08G 61/12; C08L 65/00; H01B 1/12
USPC ................. 252/500; 528/380; 361/523, 525
See application file for complete search history.

(56) References Cited

U.S. PATENT DOCUMENTS

| 2004/0085711 A1* | 5/2004 | Merker et al. ............... 361/523 |
| 2008/0248313 A1* | 10/2008 | Seshadri et al. ............. 428/419 |
| 2012/0097898 A1* | 4/2012 | Seshadri et al. ............. 252/500 |

FOREIGN PATENT DOCUMENTS

| EP | 1391474 A1 | 2/2004 |
| JP | 7-238149 A | 9/1995 |
| JP | 2010-116441 A | 5/2010 |
| JP | 2010-248487 A | 11/2010 |
| JP | 2010257954 A | * 11/2010 |
| WO | WO 2008/073149 A2 | 6/2008 |
| WO | WO 2010/113876 A1 | 7/2010 |
| WO | WO 2010/127253 A1 | 11/2010 |

OTHER PUBLICATIONS

International Search Report and Written Opinion received in connection with International Application No. PCT/US2013/042917; mailed Apr. 10, 2014.
Database CA [Online]Chemical Abstracts Service, Columbus,Ohio, US; Oct. 7, 2010,Otaka, Takeshi et al: 11 Binder for positive electrode of lithium ion secondary battery, and positive electrode material XP002714280, retrieved from STNDatabase accession No. 2010:1252866 abstract.
Udum et al., Electrochemical synthesis of soluble sulfonated poly(3-methyl thiophene), Elsevier, European Polymer Journal, vol. 40, pp. 1057-1062 (2004).

* cited by examiner

*Primary Examiner* — Douglas Mc Ginty
(74) *Attorney, Agent, or Firm* — The Marbury Law Group, PLLC

(57) ABSTRACT

[Problem] To provide a conductive polymer for solid electrolyte capacitor having outstanding solubility in solvents or dispersibility in solvents and which can produce a capacitor having outstanding capacitor characteristics in high-temperature environments.
[Means Used to Resolve the Problem]
A conductive polymer (A) for solid electrolyte capacitor containing substituted polythiophene (P) having thiophene repeating units (D) substituted by a least one type of group (s) selected from a group made up of a polyether group (a) indicated in general formula (1); an alkoxy group (b) having 1 to 15 carbon atoms; an alkoxy alkyl group (c) indicated in general formula (2); an alkyl group (d) having 1 to 15 carbon atoms; and a group (e) indicated in general formula (3); as well as thiophene repeating units (E) wherein the hydrogen atoms at position 3 and position 4 on the thiophene ring have been substituted by group (s) and sulfo group ($—SO_3H$) (f).

$$—(OR^1)_k—OR^2 \qquad (1)$$

$$—R^3—OR^4 \qquad (2)$$

$$—R^5—(OR^6)_m—OR^7 \qquad (3)$$

20 Claims, No Drawings

CONDUCTIVE POLYMER FOR SOLID ELECTROLYTE CAPACITOR

PRIORITY CLAIM

This application claims priority to Japan patent application 2012-121549 filed May 29, 2012, which is incorporated herein by reference in its entirety for all purposes.

TECHNICAL FIELD

The present invention relates to a conductive polymer for solid electrolyte capacitor. It relates more particularly to a conductive polymer which is a substituted group which functions as a dopant and has said substituted group.

TECHNICAL BACKGROUND

In recent years, there is an increasing need for increased flexibility for electronics materials. In keeping with this, a great deal of research is being carried out on application of conjugate group polymer conductive materials, charge transfer materials as well as optical function materials. In particular, this has been put into practice as an electrolyte for solid electrolyte capacitor and as an antistatic agent for conductive function materials.

In order to lower the impedance in high frequency areas in the field of capacitors, aluminum, tantalum, niobium and other oxidized coatings (dielectric coating) are etched to provide a porous body coating and a layer (conductive polymer layer) made up of polyols, polythiophene and other π conjugate polymers is formed on this surface and a conductive polymer capacitor is used as a cathode.

It is of the utmost importance to further improve the conductance and the processing characteristics and to improve the environmental stability which involves heat resistance and moisture resistance of the conductive film obtained in order to expand the practicality of these π conjugate polymers. In particular, it is well known that conductive coatings cause desorption of dopants by heating over long periods of time and that the conductive declines.

A method for obtaining conductive coatings with improved heat resistance has been proposed which involves making a composite of an organic sulfonate compound as a dopant and heat stabilizer and a conductive polymer. For example, in Patent Document 1, a method is proposed which involves mixing an aromatic group sulfonate compound with a precursor monomer of polythiophene and polymerizing it and then forming a conductive coating. However, the method described in Patent Document 1 presents problems with the processing characteristics in that there is no suitable solvent for the conductive polymers obtained.

Another proposal has been made for producing a conductive coating by carrying out doping using sulfuric acid doping on polythiophene having a specific substituted group which has outstanding solubility in solvents and carrying out heat treatment such that the heat resistance is improved (for example, Patent Document 2).

The heat resistance of the conductive coating obtained has been improved by adding a basic compound to a composition containing water-soluble conductive polymers having a sulfonic acid group and/or a carboxy group (for example, Patent Document 3).

PRIOR ART LITERATURE

Patent Literature

[Patent Document 1] Publication of Unexamined Patent Application 7-238149

[Patent Document 2] Publication of Unexamined Patent Application 2010-248487

[Patent Document 3] Publication of Unexamined Patent Application 2010-116441

OVERVIEW OF INVENTION

Problems Which the Present Invention is Intended to Resolve

However, while the conductive coating as described in Patent Document 2 has improved heat resistance, the conductance declines due to the desorption of the dopant caused by heating over a long period of time or due to oxidation and decomposition and other factors of the main chain skeleton of the polythiophene so that there is room for improvement in the heat resistance for long periods of time in high-temperature environments. In addition, although the heat resistance of the conductive polymer as described in Patent Document 3 has been improved, there is still room for improvement for the conductance and the solubility in solvents or the dispersibility in solvents. This means that as the solubility of said polymers or the solvent dispersibility is not good, there are problems in that it cannot be sufficiently impregnated in a porous body coating so that the internal resistance is low and a conductive coating with a large electrostatic capacity cannot be formed.

Taking note of the abovementioned problems, it is an object of the present invention to provide an electro-conductive polymer for solid electrolyte capacitor which has outstanding solubility in solvents or dispersibility in solvents and outstanding workability and which can produce a capacitor with outstanding capacitor properties in high temperature environments.

Means Used to Resolve the Problems

After carrying out a great deal of study on attaining the abovementioned objective, the inventors attained the present invention. This means that the present invention is a conductive polymer (A) for solid electrolyte capacitor containing a thiophene repeating units (D) substituted by at least one type of group (s) selected from a group made up of:
a polyether group (a),
an alkoxy group (b) having 1 to 15 carbon atoms;
an alkoxy alkyl group (c) indicated in general formula (2);
an alkyl group (d) having 1 to 15 carbon numbers;
and a group (e) indicated by general formula (3); and
a conductive polymer (A) for solid electrolyte capacitor containing substituted polythiophene (P) wherein the hydrogen atoms at position 3 and position 4 of the thiophene ring have thiophene repeating units (E) substituted by group (s) and sulfo group (—SO₃H) (f);

$$—(OR^1)_k—OR^2 \qquad (1)$$

[where $OR^1$ is an oxyalkylene having 2 to 4 carbon atoms; $R^2$ is an alkyl group having 1 to 15 carbon atoms; and k is an integer from 1 to 9.]

$$—R^3—OR^4 \qquad (2)$$

[where $R^3$ is a straight-chain or branching alkylene group having 1 to 4 carbon atoms; $R^4$ is a straight-chain or branching alkyl group with 1 to 15 carbon atoms.]

$$—R^5—(OR^6)_m—OR^7 \qquad (3)$$

[where $R^5$ is straight-chain or branching alkylene group having 1 to 4 carbon atoms; $OR^6$ is an oxyalkylene group having 2 to 4 carbon atoms; $R^7$ is an alkyl group having 1 to 15 carbon atoms; m is an integer from 1 to 9]; and a conductive composition for solid electrolyte capacitor containing said solid electrolyte capacitor conductive polymer A); basic compound (B); and solvent (C); a solid electrolyte capacitor conductive composition containing said solid electrolyte capacitor conductive polymer (A); a basic compound (B); a solvent (C); and a dispersant (Q); a solid electrolyte capacitor electrode made by using said solid electrolyte capacitor conductive polymer (A) and dispersant (Q); a solid electrolyte capacitor made by using said solid electrolyte capacitor conductive polymer (A); and a solid electrolyte capacitor made by using said solid electrolyte capacitor conductive polymer (A) and dispersant (Q).

The conductive polymers for solid electrolyte capacitor in the present invention have outstanding solubility or dispersibility in solvents so that the impregnation characteristics are good, the conductive polymers are impregnated on the porous body coating in a simple process, the capacity of the capacitor can be drawn out and a capacitor with outstanding capacitor characteristics in high temperature environments can be produced.

MODE OF WORKING THE INVENTION

The solid electrolyte capacitor conductive polymers (A) in the present invention is characteristic in that a hydrogen atom having a thiophene ring in third position and/or fourth position is a thiophene repeating unit (D) substituted by at least one type of group(s) selected from a group made up of a polyether group (a) indicated in the abovementioned general formula (1); an alkoxy group (b) having 1 to 15 carbon atoms; an alkoxy alkyl group (c) indicated by the abovementioned general formula (2); an alkyl group (d) having 1 to 15 carbon atoms; and wherein the hydrogen atom having a thiophene ring in position 3 or position 4 contains a substitution polythiophene (P) having a thiophene repeating unit (E) substituted by a group (s) and a sulfo group (—$SO_3H$) (f).

The abovementioned polyether group (a) is ($OR^1$) is an oxyalkylene group having 2 to 4 carbon atoms; $OR^2$ is an alkoxy group having 1 to 15 carbon atoms; The oxyalkylene group (OW) having 2 to 4 carbon atoms may be an oxyethylene group; an oxypropylene group and oxybutylene. The oxyethylene group is suitable due to its conductivity.

There should be 2 to 6 k and preferably 3 to 6 k out of consideration for the solubility or dispersibility in solvents as well as its conductance.

The alkoxy group ($OR^2$) having 1 to 15 carbon atoms on its terminal may be a methoxy group; an ethoxy group; a propoxy group; an isopropoxy group; an n-, iso-, sec- or tert-butoxy group; a pentyloxy group; a hexyloxy group; a heptyloxy group; an octyloxy group; a 2-ethyl hexyloxy group; a nonyloxy group; a decyloxy group; an undecyloxy group; a dodecyloxy group; a tridecyloxy group; a tetradecyloxy group and a pentadecyloxy group and the like. A straight-chain or branching alkoxy group having 1 to 6 carbon atoms is preferable for its conductance and a straight chain or branching alkoxy group having 1 to 4 carbon atoms is even better.

The same type of alkoxy group ($OR^2$) given in an example in the abovementioned polyether group (a) can be used as the abovementioned alkoxy group (b). The straight-chain or branching alkoxy group having 3 to 12 carbon atoms is suitable due to its conductance while a straight-chain or branching alkoxy group having 6 to 12 carbon atoms is even better.

In the abovementioned alkoxy alkyl group (c), $R^3$ is a straight-chain or branching alkylene group having 1 to 4 carbon atoms and ($OR^4$) is an alkoxy group having 1 to 15 carbon atoms. The alkylene group ($R^3$) having 1 to 4 carbon atoms may be a methylene group; an ethylene group; an n- or iso-propyl group and an n-, sec-, iso- or tert butylene group and the like. A straight-chain or branching alkylene group having 1 to 3 carbon atoms is suitable due to its solubility or dispersibility in solvents as well as its conductance while a methylene group or an ethylene is preferred. The alkoxy group ($OR^4$) having 1 to 3 carbon atoms is the same as the alkoxy group ($OR^2$) illustrated as the abovementioned polyether group (a). A straight-chain or branching alkoxy group having 3 to 12 carbon atoms is suitable due to its conductance while a straight-chain or branching alkoxy group having 6 to 12 carbon atoms is even better.

The abovementioned alkyl group (d) may be a straight-chain or branching alkyl group having 1 to 15 carbon atoms such as a methyl group; an ethyl group; an n- or iso-propyl group; an n-, iso-, sec- or tert-butyl group; an n- or iso-pentyl group; an n- or iso-hexyl group; an n- or iso-heptyl group; an n- or iso-octyl group; a 2-ethyl hexyl group; an n- or iso-nonyl group; an n- or iso-decyl group; an n- or iso-undecyl group; an n- or iso-dodecyl group; an n- or iso-tridecyl group; an n- or iso-tetradecyl group and an n- or iso-pentadecyl group and the like. A straight-chain or branching alkyl group having 3 to 12 carbon atoms is suitable due to is conductance and a straight-chain or branching alkyl group having 6 to 12 carbon atoms is even better.

In the abovementioned group (e), $R^5$ is a straight-chain or branching alkylene group having 1 to 4 carbon atoms; ($OR^6$) is an oxyalkylene group having 2 to 4 carbon atoms; and m is 1 to 9; $OR^7$ is an alkoxy group having 1 to 15 carbon atoms. The alkylene group ($R^5$) having 1 to 4 carbon atoms is the same as the alkylene group ($R^3$) illustrated in the abovementioned alkoxy alkyl group (c). A straight-chain or branching alkylene group or better yet a methylene group or ethylene group is suitable due to the solubility or dispersibility in solvents as well as its conductance.

The oxyalkylene group ($OR^6$) having 2 to 4 carbon atoms is the same as the oxyalkylene group ($OR^1$) illustrated in the abovementioned polyether group (a). The oxyethylene group is suitable due to its conductance.

There should be 2 to 6 m and preferably 3 to 6 m due to its solubility or dispersibility in solvents as well as its conductance.

An (a) group or group (b) group is suitable as an (s) group in the thiophene repeating units (D) substituted by the (s) group as well as thiophene repeating units (E) due to its solubility in solvents as well as its dispersibility in solvents.

The thiophene repeating units (D1) wherein the hydrogen atoms in position 3 of the thiophene ring are substituted by group (s) and the thiophene repeating units (E1) wherein the hydrogen atoms in position 3 of the thiophene are substituted with group (s) and the hydrogen atoms at position 4 of the thiophene ring are substituted by group (f); or thiophene repeating units (D2) wherein the hydrogen atoms in position 4 of the thiophene ring are substituted by group (s) and the thiophene repeating units (E2) wherein the hydrogen atoms in position 3 of the thiophene ring are substituted by group (f) are used as the thiophene repeating units (D) and thiophene repeating units (E) having substituted polythiophene (P) in the present invention due to the conductance.

Thiophene repeating units (D11) wherein the hydrogen atoms in position 3 of the thiophene ring are substituted by group (a) and thiophene repeating units (D1) wherein the hydrogen atoms in position 3 of the thiophene ring are substituted by group (a) and thiophene repeating units (E1) wherein the hydrogen atoms in position 4 of the thiophene ring are substituted by group (f); (D12) and (E12) which are substituted by group (b) instead of group (a) in (D11 and E11); (D13) and (E13) are substituted by group (c); (D14) and (E14) which are substituted by group (d); (D15) and (E15) which are substituted by group (e); repeating units (D21) wherein the hydrogen atoms in position 4 of the thiophene ring are substituted by group (a); thiophene repeating units (E21) wherein the hydrogen atoms in position 4 of the thiophene ring and the hydrogen atoms in position 3 of the thiophene ring are substituted by group (f); (D22) and (E22) which are substituted by group (b) instead of by group (a) in (D21) and (E21); (D24) and (E24) which are substituted by group (d) or (D25) and (E25) which are substituted by group (e) are also suitable.

The (a) group or (e) group is suitable as the (s) group in the thiophene repeating units (D1) substituted by group (s) as well as the thiophene repeating units (E1) due to their solubility or dispersibility in solvents.

The substituted polythiophene (P) in the present invention may in some cases consist only of the abovementioned thiophene repeating units (D) and (E) and may contain thiophene repeating units (G) which are not substituted which are not (D) and (E). When (G) is contained, the amount of (G) contained should usually be not more than 30 mol % and preferably 1 to 10% and preferably 1 to 5% relative to the total mol number of (D) and (E) due to their solubility in solvents and their dispersibility in solvents.

The substituted polythiophene (P) which is the conductive polymer provides electrons to the sulfo group (f) in the thiophene repeating units (E) as dopants and forms charge transfer complexes inside the molecule.

Since the charge transfer complex manifests conductance as a carrier for the electrons, the amount of thiophene repeating units (E) contained may be high, however, when in excess, the conductance declines. As a result, the amount of thiophene repeating units (E) should usually be 5 to 70 mol % and preferably 10 to 40 mol % and best of all 20 to 30 mol % relative to the total mol number of (D) and (E) out of consideration for the capacitor characteristics in high temperature environments and the facility of synthesis.

The amount of the abovementioned thiophene repeating units (D) in the substituted polythiophene (P) should usually be 30 to 95 mol % and preferably 60 to 90 mol % and best of all 70 to 80 mol % relative to the total mol number in (D) and(E) out of consideration for the capacitor properties in high-temperature environments as well as the facility of synthesis.

Method of Synthesizing Substituted Polythiophene (P)

Substituted polythiophene (P) can be obtained by sulfonization of substituted polythiophene (PO) which has an (s) group but not an (f) group.

Substituted polythiophene (PO) can be obtained by polymerizing the following substituted thiophene monomer (H) or the following substituted thiophene monomers (J). (H) and (J) carry out polymerization and form (D1) or (D2) substituted thiophene repeating units.

Method of Synthesizing Substituted Thiophene Monomers (H)

Substituted thiophene monomers (H) are not substituted at positions 2 and 5 in the thiophene ring and consist of hydrogen atoms; position 3 and/or position 4 are substituted by group (s).

Substituted thiophene monomers (H1) wherein the hydrogen atoms at position 3 and/or position 4 on the thiophene ring are substituted by group (a) can be synthesized by an ether reaction with an alcohol or alkoxide compound wherein 3-bromothiophene or 3,4-dibromothiophene and the like bonds with the radical of group (a) and the hydrogen radical. The etherification reaction can be carried out by Williamson synthesis by condensing with 3-bromothiophene or 3,4-dibromothiophene and the like using an alcohol compound as an alkoxide using a strong base; by Ullmann ether synthesis using a copper catalyst; or other well-known methods. The strong base used may be metal sodium, sodium hydrogenate and tert-butoxy potassium and the like; the copper catalyst used may be copper bromide (I) and copper iodide (I), however, it is not necessarily restricted to these.

The substituted thiophene (H2) substituted by group (b) can be synthesized in the same way as substituted thiophene (H1) except that an alcohol compound is used in which the radical of group (b) and a hydrogen radical are bonded instead of the alcohol compound in which the radical of group (a) and a hydrogen radical are bonded.

Substituted thiophene (H3) which has been substituted by group (c) can be synthesized by an etherification reaction with a halogenated alkoxy alkyl compound in which a group (c) radical and a halogen radical have bonded with 3-thiophene methanol, 3-thiophene ethanol and the like.

Substituted thiophene (H4) which has been substituted by group (d) can be synthesized by a cross-coupling reaction with a halogenated alkyl compound in which a radical of group (d) and a halogen radical have bonded with 3-bromothiophene or 3,4-dibromothiophene and the like. The cross-coupling reaction can be carried out using a halogenated alkyl compound as a Greniere reagent using metal magnesium and a cross-coupling reaction using 3-bromothiophene or 3,4-dibromothiophene and the like with a transition metal catalyst or any other well-known method. The transition metal catalyst may be 1,3-diphenyl phosphinopropane chloride nickel (II) and 1,2-diphenyl phosphinoethane chloride nickel (II) and the like although it is not necessarily restricted to these.

The substituted thiophene (H5) which has been substituted with group (e) can be synthesized in the same way as substitution thiophene (H3) is synthesized except that a halogenated compound is used wherein the radical of group (e) and a hydrogen radical are bonded instead of the halogen compound in which the radical of group (c) and the halogen radical are bonded.

Specific examples of the substituted thiophene monomer (H1) is substituted by a group (a) in position 3 or position 4 of the thiophene ring.
3-(1,4,7,10-tetraoxyundecyl)thiophene, 3-(1,4,7,10-tetraoxatetradecyl)thiophene, 3-(1,4,7,10, 3,16,19-heptaoxaeicosyl)thiophene and the like.

A specific example of the substituted thiophene monomer (H2) which has been substituted by a group (b) at position 3 or position 4 of the thiophene ring is as follows. 3-hexaoxythiophene, 3-dodecaoxythiophene and the like.

A specific example of the substituted thiophene monomer (H3) which has been substituted by group (c) at position 3 or position 4 of the thiophene ring is as follows.
3-(2-oxaoctyl)thiophene, 3-(3-oxanonyl)thiophene, 3-(2-oxatetradecyl)thiophene and the like.

A specific example of the substituted thiophene monomer (H4) which has been substituted by group (d) at position 3 or position 4 of the thiophene ring is as follows. 3-hexyl thiophene, 3-dodecyl thiophene and the like.

A specific example of the substituted thiophene monomer (H5) which has been substituted by a group (e) at position 3 or position 4 of the thiophene ring. 3-(2,5,8,11-tetraoxadodecyl) thiophene, 3-(2,5,8,11,14,17,20-heptaoxahene eicosyl) thiophene, 3-(2,5,8,11-tetraoxapentadecyl)thiophene, 3-(3,6,9,12-tetraoxatridecyl)thiophene and the like.

Method of Synthesizing Substitution Thiophene Monomer (J)

The substitution of thiophene monomer (J) is such that position 2 and position 4 of the thiophene ring are substituted by a halogen atom and are monomers wherein position 3 and/or position 4 are substituted by a group (s).

The substitution of thiophene monomer (J) which has been substituted by at least one type of group (s) selected from a group made up of group (a) through group (e) can be at least one type of substitution of thiophene (H) selected from a group made up of substitution thiophene (H1) through (H5)

The halogenated reagent may be N-bromosuccinimide and N-iodosuccinimide and the like, although there are no particular restrictions on this.

Specific examples of the substitution of thiophene monomer (J1) wherein position 3 or position 4 in the thiophene ring has been substituted by group (a) are the following thiophenes wherein position 2 or position 5 has been substituted by a halogen atom. 2,5-dibromo-3-(1,4,7,10-tetraoxaundecyl) thiophene, 2,5-diiodo-3-(1,4,7,10-tetraoxatetradecyl) thiophene, 2,5-diiodo-3-(1,4,7,10-tetraoxatetradecyl) thiophene, 2,5-dibromo-3-(1,4,7,10,13,16,19-heptaoxaeicosyl)thiophene and the like.

Specific examples of the substitution thiophene monomer (J2) wherein position 3 or position 4 of the thiophene ring has been substituted by a group (b) are the following thiophenes wherein position 2 and position 5 have been substituted by a halogen atom. 3-hexyl-2,5-diiodo oxythiophene, 2,5-dibromo-3-dodecyl oxythiophene and the like.

Specific examples of the substitution thiophene monomer (J3) wherein position 3 or position 4 of the thiophene ring has been substituted by group (c) are the following thiophenes wherein position 2 and position 5 are substituted by a halogen atom. 2,5-dibromo-3-(2-oxaoctyl)thiophene, 2,5-diiodo-3-(3-oxanonyl)thiophene, 2,5-dibromo-3-(2-oxatetradecyl) thiophene and the like.

Specific examples of the substitution thiophene monomer (J4) wherein position 3 or position 4 of the thiophene ring are substituted by a group (d) are the following thiophenes and the like wherein position 2 or position 5 have been substituted by a halogen atom. 3-hexyl-2, 5-diido thiophene, 2,5-dibromo-3-dodecyl thiophene and the like.

Specific examples of the substitution thiophene monomer (J5) wherein position 3 or position 4 of the thiophene ring have been substituted by group (e) are as follows. 2,5-dibromo-3-(2,5,8,11-tetraoxadodecyl)thiophene, 2,5-diido-3-(2,5,8,11,14,17,20-heptaoxahene eicosyl)thiophene, 2,5-dibromo-3-(2,5,8,11-tetraoxapentadecyl)thiophene, 2,5-diido-3-(3,6,9, 12-tetraoxatridecyl)thiophene and the like.

Method of Polymerizing Substitution Thiophene Monomers (H), (J) A substitution polythiophene (PO) having thiophene repeating units (D) can be synthesized by using a cross-coupling reaction using oxidation polymerization of substituted thiophene (H) or a transition metal catalyst of substitution thiophene monomer (J) or other well-known method.

The substitution polythiophene (PO) may be made up solely of the abovementioned thiophene repeating unit (D) and it may contain thiophene repeating unit (G) wherein position 3 and position 4 of the thiophene ring have not been substituted. Substitution polythiophene (PO) which contains (G) should copolymerize a monomer wherein 5 of a substitution thiophene (H) and thiophene or a substitution thiophene monomer (J) and position 2 and position 5 of the thiophene ring are substituted with a halogen atom (specific examples are 2,5-dibromothiophene, 2,5-diido thiophene and the like). A monomer wherein position 2 and position 5 of the thiophene ring have been substituted by a halogen atom should be copolymerized in forming (G).

The weight-average molecular weight (hereinafter abbreviated to "Mw") of the substitution polythiophene (P0) in the present invention measured using gel permeation chromatography (GPC) should be 2,000 to 3,000,000 and preferably 10,000 to 150,000 out of consideration of the solubility or dispersibility in solvents.

The weight-average molecular weight of the substituted polythiophene (P0) is measured under the following conditions using GPC.

Device (one line): GPC system model number CBM-20 Alite made by Shimadzu Seisakusho.
Column (one line): two TSK GEL GMH6 [made by Toso (Ltd)].
Measuring Temperature: 40° C.
Sample Solution: 0.25 weight % N,N-dimethyl formamide
Amount of Solution Injected: 100 μL
Detection Device: refraction index detector
Standard Substance: Toso (Ltd.) Standard Polystyrene (TSK Standard Polystyrene) 12 items (molecular weight 500 1050 2800 5970 9100 18100 37900 96400 190000 355000 1090000 2890000)

The substituted polythiophene (P) in the present invention can be synthesized by sulfonating position 3 or position 4 of the thiophene ring in the partially thiophene repeating unit (D) as thiophene repeating unit (E) using a sulfonating reagent on the abovementioned substituted polythiophene (P0). The sulfonating reagent used may be monochlorosulfate, fuming sulfuric acid and concentrated sulfuric acid and the like as the sulfonating reagent, however, it is not necessarily restricted to these.

The regioregularity (RR) which is defined as follows for the substituted polythiophene (P) in the present invention is usually 50% and above and it should be 80% or greater and best of all 90% and above out of consideration for the conductance. Substituted polythiophene (P) having regioregularity of 90% or greater, can be synthesized by a cross-coupling reaction of substituted thiophene monomer (J) using 1,3-diphenyl phosphinopropane chloride nickel (II) and 1,2-diphenyl phosphinoethane chloride nickel (II) and other catalysts.

Substituted polythiophene (P) having regioregularity of 50 to 90% can be synthesized by oxidation polymerization of substituted thiophene monomer (H) using iron chloride (III) and/or other catalysts. The regioregularity can increase in some cases with lower reaction temperature. Furthermore, the regioregularity is such that a group which bonds to position 3 and position 4 of the thiophene ring of the substituted polythiophene (P) is applied when combining a hydrogen atom and group (s), combining a different group (s) or combining group (f).

Regioregularity (RR) in the present invention is defined as follows.

There are four types of bond for the substituted polythiophene (P): an HT-HT bond (B 1); a TT-HT bond (B2); a HT-HH bond (B3); and a TT-HH bond (B4) as indicated in the following general formula as representative examples. Furthermore, here HT indicates "head-to-tail"; TT indicates "tail-to-tail"; and HH indicates "head-to-head".

[Chemical Forumla 1]

Where R in the chemical formula of the abovementioned four bonding types is group (a) through group (e).

The regioregularity in the present invention is defined as the percentage (%) of HT-HT bonds (head-to-tail, head-to-tail) in the substituted polythiophene (P) and is calculated in some cases by using the following mathematical formula (1).

$$\text{Regioregularity } (RR) = B1 \times 100/(B1+B2+B3+B4) \qquad (1)$$

Specifically the protons of these bonds indicate respectively the inherent chemical shift (δ) using the nuclear magnetic resonance (¹H-NMR) so that in some cases it can be calculated from the integral value of the chemical shift which corresponds to the four types of bonds.

When dealing with a polythiophene derivative having thiophene repeating unit (D14), specifically HT-HT bond (B1): δ=6.98; TT-HT bond (B2): δ=7.00; HT-HH bond (B3): δ=7.02; TT-HH bond (B4): δ=7.05. Accordingly, the integral values S1, S2, S3 and S4 in the chemical shift inherent to (B1), (B2), (B3), (B4) can be in some cases calculated and the regioregularity (RR) is calculated using the following mathematical formula (2) based on the percentage (%) of integral value Si in the chemical shift inherent to (B1) relative to the sum of the integral values.

$$\text{Regioregularity } (RR) = X1 \times 100 / (S1 + S2 + S3 + S4) \qquad (2)$$

Furthermore, measuring the abovementioned (¹H-NMR) was carried out under the following conditions—measuring instrument: AVANCE III400 model digital NMR [Burka Biospin (Ltd.); measuring solvent: bichloroform; measuring temperature: 27° C.

As indicated above, by etching the oxidation coating made of aluminum and the like as a porous body coating in the solid capacitor which is required so that the impedance in the high frequency regions declines, a conductive polymer layer is formed on the surface and a capacitor is used as an electrode (cathode). However, when the method which involves coating a dispersion liquid containing a precursor monomer of the conductive polymer, the method which involves coating conductive polymer polypyrrol dissolved in a solvent using dodecyl benzene sulfonate as a dopant and other conventional methods are used, there are problems in that the production efficiency of the capacitor is extremely poor and the capacity of the capacitor cannot be increased more efficiently, the dopant is an acid and the capacitor characteristics deteriorate over a long period of time in high-temperature environments.

On the other hand, conductive polymer (A) used for the solid electrolyte capacitor in the present invention can be completely dissolved or dispersed in a solvent and since it has high conductance, the conductive polymers are impregnated in a porous body coating in a simple process and the capacitor capacity can be increased efficiently. In addition, desorption of the dopant can be inhibited by covalent bonding of the dopant on the main chain skeleton of the polythiophene, the stability of the main chain skeleton of the polythiophene is upgraded so that there is no possibility that the characteristics of the capacitor will deteriorate in high-temperature environments.

A solid electrolyte capacitor conductive composition (S1) made by mixing solid electrolyte capacitor conductive polymer (A) and basic composition (B) and solvent (C) and a solid electrolyte capacitor conductive composition (S2) made by mixing solid electrolyte capacitor conductive polymer (A) and basic compound (B) and solvent (C) and dispersant (Q) can be used as the conductive composition of the solid electrolyte capacitor in the present invention.

Specifically, the solid electrolyte capacitor conductive polymer (A) is dissolved or dispersed at the desired percentage in the solvent (C) as (Si), the desired amount of basic compound (B) is added to this, thereby providing solid electrolyte capacitor conductive composition (S1).

The amount of solid electrolyte capacitor conductive polymer (A) should be 0.01 to 15 weight % relative to the total amount of solid electrolyte capacitor conductive polymer (A), basic compound (B) and solvent (C) and preferably 0.03 to 10 weight % and better still 0.05 to 5 weight % out of consideration for the solubility or dispersibility in solvents.

In (S2), dispersant (Q) may be added at any time before, during or after the solid electrolyte capacitor conductive polymer (A) is dispersed, however, it should be added either before or after the dispersing process out of consideration for the dispersibility of (A) and the stability of the dispersing element.

There are no particular restrictions on the dispersing and mixing device used to disperse the solid electrolyte capacitor conductive polymer (A) in solvent (C) and (1) the anchor type stirring method; (2) the rotor-stator method [for example, Ebaramilder made by Ebara (Ltd.)]; (3) the line mill method [for example, the line flow mixer]; (4) the stationary tube mixing method [for example, the static mixer]; (5) the vibration method [for example, the Vibro Mixer (made by Reika Kogyo Ltd.); (6) the ultrasonic collision method [for example, the ultrasonic homogenizer]; (7) the high-pressure collision method [for example, the Gaolin homogenizer (made by Gaolin)]; (8) the film emulsification method [for example, the film emulsification module]; and (9) the centrifuge thin film contact method [for example, [the Filmix] (made by Primix)] and other types of dispersion and mixing devices may be used.

The anchor type stirring method, rotor-stator method, the line mill method, stationary tube mixing method, ultrasonic collision method, centrifugal thin film contact method and other dispersion and mixing device are suitable out of consideration for temperature adjustment, supply of solid grains and dispersion capability.

Two or more dispersion mixing devices selected from these dispersion mixing devices may be used together as the dispersion mixing device. Furthermore, the number of rotations when these dispersion mixing devices are used should usually be 100 to 30000 rpm and preferably 500 to 30000 rpm, and better still 1000 to 30000 rpm and particularly 200 to 3000 rpm out of consideration for the dispersion stability of the solid electrolyte capacitor conductive polymer (A).

The temperature of the dispersed liquid when dispersion and mixing are carried out using a dispersion mixing device should be less than the fusing temperature of (A) and preferably a temperature which is at least 5° C. lower than the fusing temperature and a temperature which is greater than room temperature and preferably a temperature which is at least 10 to 120° C. lower than the fusing temperature and room temperature or greater in order to prevent decomposition and degradation of the solid electrolyte conductive polymer (A).

The amount of conductive polymer (A) for solid electrolyte capacitor contained should be 0.01 to 15 weight % relative to the total amount of the solid electrolyte capacitor conductive polymer (A), basic compound (B), solvent (C) and dispersant (Q) and preferably 0.03 to 10 weight % and best of all 0.05 to 5 weight % out of consideration for the dispersing characteristics.

In addition, the resident time of solid electrolyte capacitor conductive polymer (A) and solvent (C) inside the dispersion and mixing device should be 0.1 to 60 minutes and preferably 10 to 30 minutes.

Solid electrolyte capacitor conductive composition (S) is used to form the electrode for the solid electrolyte capacitor by coating it onto the solid electrolyte capacitor element and letting it dry. The solubility or dispersion stability of the solid electrolyte capacitor conductive polymer (A) in solvent (C) is improved when (S) is impregnated with the basic compound (B). The reason for this is that the electrostatic mutual action between the molecules carried out by the charge transfer complex faulted by dispersant (Q) in the solid electrolyte capacitor conductive polymer (A) is thought to be weakened.

The dispersion stability of the solid electrolyte capacitor conductive polymer (A) in solvent (C) is improved when (S) is impregnated with dispersant (D). The reason for this is that the electrostatic action between the molecules brought about by the charge transfer complex formed by dispersant (Q) in the solid electrolyte capacitor conductive polymer (A) is thought to be weakened.

Basic compound (B)

lithium hydroxide, sodium hydroxide, potassium hydroxide and other inorganic bases; 1,8-diazabicyclo(5.4.0)undecene7,1,5-diazabicyclo(4.3.0)nonene-5 and other amidine compounds; 1,1,3,3-tetramethyl guanidine; 2-amino-4,6-dimethyl pyrimidine and other guanidine compounds; triethyl amine, dimethyl ethyl amine, trimethyl amine and other tertiary amines having an alkyl group with 1 to 4 carbon atoms; diethyl amine, methyl ethyl amine, methyl amine and other secondary amines having an alkyl group with 1 to 4 carbon atoms; ethyl amine, methyl amine and other primary amines having an alkyl group with 1 to 4 carbon atoms; ammonia, hydrazine, 1-acetyl-2-phenyl hydrazine, tert-butoxy carbonyl hydrazine and other hydrazine compounds.

Of these, 1,5-diazabicyclo(4.3.0)nonene-5,1,1,3,3-tetramethyl guanidine, triethyl amine, ammonia and hydrazine are preferable due to their conductance.

The amount of basic compound (B) contained should be 0.006 to 50 weight % relative to the entire amount of the solid electrolyte capacitor conductive polymer (A), basic compound (B) and solvent (C); and should be 0.02 to 35 weight % and preferably 0.03 to20 weight % out of consideration for the solubility or dispersibility of the solvent. Furthermore, in all cases, the amount of basic compound (B) contained should be 51 weight % to 300 weight % relative to the weight of the solid electrolyte capacitor conductive polymer (A).

Solvent (C) should be a solvent which is suitable for solid electrolyte capacitor conductive polymer (A) in order to obtain a uniform solution or dispersed solution with no precipitate.

Solvent (C) may have a chlorine group with 1 to 10 carbon atoms; an amide group; an ether group; an alcohol group; a ketone group; a sulfur group solvent and water and the like. The following are especially suitable: chloroform; methylene chloride; dimethyl formamide; N-methyl pyrrolidone; THF; 1,3-dioxolane; methanol; ethylene glycol; acetone; methyl ethyl ketones; γ-butyrolactone; cyclopentanone; cyclohexanone; dimethyl sulfoxide; water and mixtures of these. Of these, methanol, ethylene glycol; γ-butyrolactone; water; and mixtures of these are especially suitable given their solubility or dispersion stability.

The amount of solvent (C) contained should be 50 to 99.9 weight % relative to the entire amount of solid electrolyte capacitor conductive polymer (A); basic compound (B); and solvent (C); and preferably 80 to 99 weight % and preferably 90 to 98 weight % out of consideration for the solubility or dispersibility in the solvent.

Examples of the dispersant (Q) are: an emulsifying dispersant (Q1); a nonionic surface-active agent (Q2); an anionic surface-active agent; an amphoteric surface-active agent (Q5) and another emulsification dispersant (Q6). The dispersant (Q) may be used independently or two or more may be used together.

The (Q1) used may be: a polyvinyl alcohol; starch and a derivative thereof; carboxy methyl cellulose; methyl cellulose and hydroxyl ethyl cellulose and other cellulose derivatives and polyacrylates; polyacrylate soda and other (co) polymers containing a carboxyl group as well as polystyrene sulfonate; polystyrene sulfonate soda; polyvinyl sulfonate; polyvinyl sulfonate soda and other (co) polymers containing a sulfo group.

The (Q2) used may be an AO adduct type nonionic surface-active agent as well as a polyhydric alcohol type nonionic surface-active agent. The AO adduct type may be an EO adduct of an aliphatic alcohol having 10 to 20 carbon atoms; a phenol EO adduct; a nonyl phenyl EO adduct; an alkyl amine EO adduct having 8 to 22 carbon atoms as well as an EO adduct of polypropylene glycol and the like. The polyhydric alcohol used may be: a fatty acid (4 to 24 carbon atoms) ester (such as glycerol monostearate; glycerol monooleate; sorbitan monolaurate as well as sorbitan monooleate and the like) of a polyhydric (trivalent to octovalent or greater) alcohol (2 to 30 carbon atoms) as well as an alkyl (carbon number of 4 to 24) poly (degree of polymerization of 1 to 10) glycoside and the like.

The (Q3) used may be ether carboxylate or a salt thereof [sodium lauryl ether acetate and (poly) oxyethylene (1 to 100 mols added) sodium lauryl ether acetate and the like)] having a hydrocarbon group with 8 to 24 carbon atoms; sulfate ester or sulfate ether ester and salts thereof [sodium lauryl sulfate, (poly) oxyethylene (1 to 100 mols added) sodium lauryl sulfate, (poly)oxyethylene (1 to 100 mols added) triethanol amine lauryl sulfate as well as (poly) oxyethylene (1 to 100 molls added) palm oil fatty acid monoethanol amide sodium sulfate and the like] having 8 to 24 carbon atoms; sulfonate having a hydrocarbon group with 8 to 24 carbon atoms [dodecyl benzene sodium sulfonate and the like]; sulfosuccinate having 1 or 2 hydrocarbon group with 8 to 24 carbon atoms; phosphate esters having a hydrocarbon group with 8 to 24 carbon atoms; phosphate esters or ether phosphate esters having a hydrocarbon group with 8 to 24 carbon atoms as well as salts thereof [sodium lauryl phosphate and (poly) oxyethylene (1 to 100 mols added) sodium lauryl phosphate and the like]; fatty acid having a hydrocarbon group with 8 to 24 carbon atoms [sodium lauryl phosphate and triethanol amine lauryl phosphate and the like]; acylated amino hydrochloride having 8 to 24 carbon atoms [palm oil fatty acid sodium methyl taurine; palm oil fatty acid sodium sarcosine, palm oil fatty acid sarcosine triethanol amine, N-palm oil fatty acid acyl-L-triethanol amine glutamate; N-palm oil fatty acid acyl-L-sodium glutamate as well as lauryl method-β-sodium alanine and the like].

The (Q4) used may be the quaternary ammonium salt type [stearyl trimethyl methyl ammonium chloride; behenyl trimethyl ammonium chloride; distearyl dimethyl ammonium chloride as well as ethyl lanolin sulfate fatty acid amino propyl ethyl dimethyl ammonium and the like] as well as amino salt type [diethyl stearate amino ethyl amide lactate; dilauryl amine hydrochloride as well as oleyl amine lactate and the like].

The (Q5) used may be a betaine type amphoteric surface-active agent [palm oil fatty acid amide propyl dimethyl amino betaine acetate; lauryl dimethyl amino betaine acetate; 2-alkyl-N-carboxy methyl-N-hydroxy ethyl imidazolium betaine; lauryl hydroxy sulfobetaine as well as lauryl amide ethyl hydroxyl ethyl carboxy methyl betaine hydroxy propyl sodium phosphate and the like]; as well as an amino acid type amphoteric surface-active agent [β-lauryl amino sodium propionate and the like].

The amount of dispersant (Q) to be contained should be 0 to 5 weight % relative to the entire amount of solid electrolyte capacitor conductive polymer (A); basic compound (B); and solvent (C); and should be 0 to 3 weight % and preferably 0 to 1 weight % out of consideration of the dispersibility; while it is recommended that it not be used.

While thiophene repeating units (E) are contained in the present invention as a dopant, another dopant (F) may be used as long as the effect of the present invention is no adversely affected.

The dopant (F) used may be an inorganic acid (sulfuric acid and nitric acid and the like), halogen ions (iodine, bromine and chlorine and the like), halide ions (tetrafluoroboron and perchloric acid), quinine compounds [chloranilic acid, p-chloranyl, p-benzoquinone, p-quinone dioxime, dichlorodicyanoquinone (DDQ), p-naphthoquinone, anthraquinone, chloroanthraquinone and p-toluquinone and the like];alkyl substituted organic sulfate ions (methane sulfonate and dodecyl sulfonate and the like); cyclic sulfonate ions (camphor sulfonate ions and the like); alkyl substituted or non-substituted benzene mono- or disulfonate ions (benzene sulfonate; paratoluene sulfonate; dodecyl benzene sulfonate as well as benzene disulfonate and the like); alkyl substituted ions or non-substituted ions having 1 to 4 sulfonate groups); anthracene sulfonate ions; anthraquinone sulfonate ions; alkyl substituted or non-substituted biphenyl sulfonate ions (alkyl biphenyl sulfonate as well as biphenyl disulfonate and naphthalene sulfonate formaline condensates and the like).

The amount of dopant (F) used should be 5 to 300 weight % and preferably 10 to 150 weight % relative to the solid electrolyte capacitor conductive polymer (A).

After the solid electrolyte capacitor conductive composition (S) has been coated onto the substrate, a solid electrolyte capacitor electrode can be obtained with little deterioration in the capacitor characteristics in high temperature environments by heat treatment.

The method used for coating (S) onto the matrix may be the spin coating method, drop casting method, dip coating method and method which impregnates the substrate onto the solid electrolyte capacitor conductive composition (S). Plastic, glass, metal, rubber, ceramic and paper and the like may also be used as the matrix.

When the solid electrolyte capacitor electrode is manufactured using the solid electrolyte capacitor conductive composition (S) is used, solvent (C) which is contained in the solid electrolyte capacitor conductive composition (S) must be removed. When a solvent with a low boiling point is used, the solvent is removed by natural drying at ordinary temperature or by heat drying using air circulation drying. However, when a solvent with a high boiling point is used, heat drying should be used using a reduced pressure dryer. In addition, when manufacturing a solid electrolyte capacitor electrode using a solid electrolyte capacitor conductive composition (S), the basic compound (B) which is contained in the solid electrolyte capacitor conductive composition (B) should be removed before impregnating in the solid electrolyte capacitor conductive composition (S) in order to coat the solid electrolyte capacitor conductive polymer (A) evenly on the substrate. The method used to remove the basic compound (B) may be any method used to pass the solid electrolyte capacitor conductive composition (S) through cation exchange resin.

The thickness of the film obtained by drying the solid electrolyte capacitor conductive polymer (A) formed on the surface of the substrate should be 0.05 to 100 μm and preferably 0.1 to 50 μm. When the coating is thinner than 0.05 μm, sufficient conductance cannot be obtained. Moreover, when the coating is thicker than 100 μm, there are problems in that cracks readily appear during formation and peeling occurs.

The heat treatment temperature should be 100 to 190° C. and preferably 110 to 170° C. to obtain a highly conductive film using the solid electrolyte capacitor conductive polymer (A) in the present invention. When the temperature is lower than 100° C., a sufficient strength and conductance cannot be obtained. In addition, when the temperature is greater than 190° C., the conductance may deteriorate.

The heating time may be selected as appropriate in accordance with the heating temperature, however, it is normally 0.5 to 8 hours and preferably 1 to 4 hours. When the heating time is too short, the performance of the abovementioned solid electrolyte capacitor electrode may not be sufficient.

The solid electrolyte capacitor conductive polymer (A) in the present invention has high heat resistance and outstanding conductive. The conductive polymers are impregnated on the conductive polymers in a simple process and the capacitor capacity can be increased efficiently. It is useful as a solid electrolyte capacitor can be produced with little deterioration in the capacitor properties in high-temperature environments.

[Practical Embodiments of Invention]

Next, we shall explain the present invention in greater detail using practical embodiments and comparative examples of it. However, it should by no means be construed that the present invention is restricted to these.

<Manufacturing Embodiment 1>

Synthesis of sulfonated poly{3-(1,4,7,10,13,16,19-heptaoxaeicosyl)}thiophene (P-1-1):

(1) Synthesis of 3-(1,4,7,10,13,16,19-heptaoxaeicosyl) thiophene;

We dispersed 3.68 parts of hydrogenated sodium (60% paraffin dispersion) in 11 parts of N,N-dimethyl formamide and dropped 27.25 parts of hexaethylene glycol monomethyl ether [made by Tokyo Oka Kogyo (Ltd.)] in it. The reaction solution foamed and was a turbid white color. When the foaming had subsided, we added 7.50 parts of 3-butyrothiophene [made by Aldrich Inc.] and 0.18 parts of copper iodide, in that order, to the reaction solution. We heated the reaction solution to 110° C. and reacted it for 2 hours. After the reaction was completed, we cooled it to room temperature, added 30 parts of a 1 M ammonium chloride aqueous solution, passed it to a solution separation funnel using 30 parts of ethyl acetate and then separated the aqueous layer. We washed the organic layer twice using 30 parts of distilled water, removed the ethyl acetate and obtained 15.66 parts (yield of 90%) of 3-(1,4,7,10,13,16,19-heptaoxaeicosyl) thiophene.

(2) Synthesis of 2,5-dibromo-3-(1,4,7,10,13,16,19-heptaoxaeicosyl)thiophene;

We dissolved 15.66 parts of the abovementioned 3-(1,4,7, 10,13,16,19-heptaoxaeicosyl)thiophene and 15.10 parts of N-bromosuccinimide in 73 parts of THF and reacted it for 2 hours at room temperature. We removed the precipitate with a glass filter using 50 parts of ethyl acetate and removed the THF and the ethyl acetate. We obtained 17.53 parts (yield of 79%) of 2,5-dibromo-3-(1,4,7,10,13,16,19-heptaoxaeicosyl) thiophene by refining the mixture obtained using a silica gel column.

(3) Synthesis of poly{3-(1,4,7,10,13,16,19-heptaoxaeicosyl) thiophene} (P0-1);

We dissolved 17.53 parts of the abovementioned 2,5-dibromo-3-(1,4,7,10,13,16,19-heptaoxaeicosyl)thiophene in 290 parts of THF. Then we added 32.37 parts of a 1 M isopropyl magnesium bromide THF solution [made by Tokyo Oka Kogyo (Ltd.)] and reacted it for 30 minutes at 75° C. We added 0.177 parts of [1,3-bis(diphenyl phosphino)propane]-dibromo nickel (II) to the reaction solution and reacted it for 2 hours at 75° C.

We let the reaction solution cool to room temperature and then added 5 parts of methanol. We transferred the reaction mixture to a Soxhlet extractor and washed it with 150 parts of a mixed solvent consisting of a mixture of hexane and methanol at a weight ratio of 2:1. Last of all, we extracted the residue using 150 parts of chloroform, removed the solvent and obtained 8.12 parts (yield of 65%) of poly {3-(1,4,7,10,13,16,19-heptaoxaeicosyl)thiophene}. The regioregularity which had been calculated using a method which used the abovementioned $^1$H-NMR was 96.3% and the weight-average molecular weight was 32100.

(4) Synthesis of sulfonated poly {3-(1,4,7,10,13,16,19-heptaoxaeicosyl)}thiophene (P-1);

We mixed 180 parts of fuming sulfuric acid with 8.12 parts of the abovementioned poly {3-(1,4,7,10,13,16,19-heptaoxaeicosyl)thiophene} (PO-1) and reacted it for 48 hours at 85° C. We diluted the reaction mixture with 6000 parts of distilled water, then stirred it for 1 hour at room temperature and dispersed it. We precipitated the dispersing element using a centrifuge, removed the supernatant and then washed it twice using 800 parts of distilled water using a centrifuge. We placed the precipitate obtained in 6000 parts of distilled water, irradiated it with ultrasonic waves for 30 minutes and dispersed it.

We passed the dispersion obtained through a column packed with 30 parts of ion exchange resin [Amberjet 4400, made by Aldrich (Inc.)], removed the remaining sulfonic acid, subjected the water to decompression and removed it and obtained 8.15 parts (yield of 96%; total yield of 44%) of sulfonated poly {3-(1,4,7,10,13,16,19-heptaoxaeicosyl) thiophene (P-1) having the thiophene repeating units (D-1) and (E-1) indicated in formula (4) and formula (5). We analyzed this using NMR and the amount of thiophene repeating units (D) contained was 71 mol % and the amount of thiophene repeating units (E) was 29 mol %. In some cases, the sulfonation reaction might cleave some of the side groups of the polymer. In some cases, hydroxyl terminal groups might result.

[Chemical Formula 2]
[Chemical Formula 3]

<Manufacturing Embodiment 2>

Synthesis of sulfonated poly {3-(1,4,7,10,13,16,19-heptaoxaeicosyl)}thiophene (P-1-2):

We carried out the same procedures as in Manufacturing Example 1 except that we changed the weight of the 0.117 parts of [1,3-bis(diphenyl phosphino)propane]-dichloro nickel (II) to 0.088 parts and the regioregularity was 96.3%. We synthesized 7.56 parts of {3-(1,4,7,10,13,16,19-heptaoxaeicosyl)}thiophene having a weight-average molecular weight of 69200 and obtained 7.59 parts of sulfonated poly (3-dodecyl thiophene) (P-1-2) having thiophene repeating units (D-1) and (E-1) indicated in formula (4) and formula (5) (total yield of 41%). We analyzed this using NMR and the amount of thiophene repeating units (D) contained was 71 mol % and the amount of thiophene repeating units (E) contained was 29 mol %.

<Manufacturing Example 3>

Synthesis of sulfonated poly (3-dodecyl thiophene) (P-2):

(1) Synthesis of 3-dodecyl thiophene;

We dissolved 18.60 parts of 3-bromothiophene and 0.71 parts of [1,3-bis(diphenyl phosphino)propane]-dichloro nickel (II) in 110 parts of diethyl ether, added 114 parts of a 1 M dodecyl magnesium bromide diethyl ether solution [made by Aldrich (Inc.)] at 0° C. and reacted it for 24 hours at room temperature.

After the reaction was completed, we added 50 parts of distilled water and moved it to a liquid separating funnel using 50 parts of ethyl acetate. Then, we separated the aqueous layer. We washed the organic layer twice using 30 parts of distilled water and then removed the diethyl ether and the ethyl acetate. We obtained 19.58 parts (yield of 68%) of 3-dodecyl thiophene by refining the mixture obtained using a silica gel column.

(2) Synthesis of sulfonated poly(3-dodecyl thiophene) (P-2);

We carried out the same procedures as in Manufacturing Example 1 except that we using 19.58 parts of the abovementioned 3-dodecyl thiophene instead of 15.66 parts of 3-(1,4,7,10,13,16,19-heptaoxaeicosyl). The regioregularity was 99.1% and we synthesized 10.01 parts of poly (3 dodecyl thiophene) having a weight-average molecular weight of 21400 and we obtained 10.49 parts sulfonated poly (3-dodecyl thiophene) (P-2) having thiophene repeating units (D-2) and (E-2) indicated in formula (6) and formula (7) (total yield of 34%). We analyzed this using NMR and the amount of thiophene repeating units (D) contained was 78 mol % and the amount of thiophene repeating units (E) contained was 22 mol %.

Furthermore, when we changed the 3-(1,4,7,10,13,16,19-heptaoxaeicosyl)thiophene to 3-dodecyl thiophene, adjustment procedures were carried out to adjust the amount of each of the raw materials so that the mol ratio of the reaction component and the weight ratio of the non-reaction component (solvent and the like) was the same as that in Manufacturing Example 1. The same procedures were also carried out for Manufacturing Examples 4 to 7 as follows.

[Chemical Formula 4]
[Chemical Formula 5]

<Manufacturing Example 4>

Synthesis of sulfonated poly {3-(2,5,8,11-tetraoxadodecyl)}thiophene (P-3);

(1) Synthesis of 3-(2,5,8,11-tetraoxadodecyl)thiophene;

We dispersed 4.96 parts of sodium hydride (60% paraffin dispersion) in 60 parts of THF and dropped 10.89 parts of 3-methanol thiophene [made by Tokyo Oka Kogyo (Ltd.) in this. The reaction solution foamed and turned a turbid white color. After the foaming had subsided, we added 28.16 parts of diethylene glycol-2-bromoethyl methyl ether [made by Tokyo Oka Kogyo (Ltd.). We heated the reaction solution to 66° C. and reacted it for 2 hours. After the reaction was completed, we set it aside to cool to room temperature and we added 30 parts of a 1 M ammonium chloride aqueous solution. We transferred this to a liquid separating funnel using 50 parts of ethyl acetate and then separated the aqueous layer. We washed the organic layer twice using 30 parts of distilled water and then removed the THF and the ethyl acetate and obtained 23.10 parts (yield of 93%) of 3-(2,5,8,11-tetraoxa dodecyl)thiophene.

(2) Synthesis of sulfonated poly {3-(2,5,8,11-tetraoxa dodecyl)} thiophene (P-3).

We carried out the same procedures as in Manufacturing Example 1 except that we used 23.10 parts of the abovementioned 3-(2,5,8,11-tetraoxaeicosyl)thiophene instead of 5.66 parts of 3-(1,4,7,10,13,16,19-heptaoxaeicosyl)thiophene and the regioregularity was 95.3%. We synthesized 12.02 parts of poly {3-(2,5,8,11-tetraoxadodecyl)}thiophene having a weight-average molecular weight of 22100 and obtained 12.28 parts of sulfonate poly {3-(2,5,8,11-tetraoxadoedecyl)}thiophene (P-3) having the thiophene repeating units (D-3) and (E-3) indicated in formula (8) and formula (9) (total yield of 46%). We analyzed this using NMR and the amount of thiophene repeating units (D) contained was 75 mol % and the amount of thiophene repeating units (E) contained was 25 mol %.

[Chemical Formula 6]
[Chemical Formula 7]

<Manufacturing Example 5>

Synthesis of sulfonated poly(3-heptaoxy)thiophene (P-4):

We carried out the same procedures as in Manufacturing Example 1 except that we use 18.81 parts of 1-heptanol [made by Tokyo Oka Kogyo (Ltd.)] instead of 27.25 parts of hexaethylene glycol monomethyl ether and the regioregularity was 98.2%. We synthesized 8.51 parts of poly (3-heptaoxy) thiophene having a weight-average molecular weight of 16800 and obtained 9.06 parts of sulfonated poly (3-heptaoxy)thiophene (P-4) having thiophene repeating units (D-4) and (E-4) indicated in formula (10) and formula (11) (total yield of 52%). We analyzed this using NMR and the amount of thiophene repeating units (D) contained was 76 mol % and the amount of thiophene repeating units (E) contained was 24 mol %.

[Chemical Formula 8]
[Chemical Formula 9]

<Manufacturing Example 6>
Synthesis of sulfonated poly(3-methyl)thiophene (P-5):

We carried out the same procedures as in Manufacturing Example 1 except that we used 13.33 parts of 3-methyl thiophene [made by Tokyo Oka Kogyo (Ltd.)] instead of 15.66 parts of 3-(1,4,7,10,13,16,19-heptaoxaeicosyl) thiophene. We synthesized 8.32 parts of poly(3-methyl) thiophene having a regioregularity was 98.8% and a weight-average molecular weight of 11200 and obtained 9.64 parts of sulfonated poly (3-methyl)thiophene (P-5) having the thiophene repeating units (D-5) and (E-5) (total yield of 60%). We analyzed this using NMR and the amount of thiophene repeating units (D) contained was 72 mol % and the amount of thiophene repeating units (E) contained was 28 mol %.

[Chemical Formula 10]
[Chemical Formula 11]

<Manufacturing Example 7>
Synthesis of sulfonated poly(3-methoxy)thiophene (P-6):

We carried out the same procedures as in Manufacturing Example 1 except that we used 12.89 parts of 3-methoxy thiophene [made by Tokyo Oka Kogyo (Ltd.)] instead of 15.66 parts of 3-(1,4,7,10,13,16,19-heptaoxaeicosyl) thiophene, synthesized 9.12 parts of poly (3-methoxy) thiophene having a regioregularity of 97.5% and a weight-average molecular weight of 11600 and obtained 10.33 parts (total yield of 68%) of sulfonated poly (3-methoxy)thiophene (P-6) having the thiophene repeating units (D-6) and (E-6) indicated in formula (14) and in formula (15). We analyzed this using NMR and the amount of thiophene repeating units (D) contained was 73 mol % and the amount of thiophene repeating units (E) contained was 27 mol %.

[Chemical Formula 12]
[Chemical Formula 13]

<Comparative Manufacturing Example 1>
Synthesis of poly(3-bromo-4-thiophene sulfonate) (Comparative P-1):

(1) synthesis of 3-bromo-4-thiophene sulfonate:

We mixed 60 parts of fuming sulfuric acid with 36.59 parts of 3-bromothiophene [made by Tokyo Oka Kogyo (Ltd.)] and reacted it for 24 hours at 85° C. We diluted the reaction mixture with 2000 parts of distilled water and then transferred it to a liquid separating funnel using 200 parts of ethyl acetate and we separated the aqueous layer. We washed the organic layer twice using 30 parts of distilled water and then removed the ethyl acetate. We obtained 7.36 parts (total yield of 18%) of 3-bromo-4-thiophene sulfonate by refining the mixture obtained using a silica gel column.

(2) Synthesis of poly(3-bromo-4-thiophene sulfonate) (comparative P-2):

We dissolved 7.36 parts of the abovementioned 3-bromo-4-thiophene sulfonate and 4.04 parts of triethyl amine in 12 parts of a mixed solvent made by mixing water and acetonitrile at a weight ratio of 1:1 and dropped 9.13 parts of peroxoammonium disulfate in a solution made by dissolving in 32 parts of a mixed solvent made by mixing water and acetonitrile at a weight ratio of 1:1 at 0° C. After we completed dropping, we reacted it the reaction solution for 24 hours at room temperature.

After the reaction was completed, we precipitated the reaction mixture using a centrifuge. We removed the supernatant and then washed 60 parts of a 1% methanol sulfate solution twice using a centrifuge and removed the remaining triethyl amine We dried the precipitate obtained and obtained 4.16 parts (total yield of 10%) of poly (3-bromo-4-thiophene sulfonate) (comparative P-1) having the thiophene repeating units (comparative E-1) indicated in formula (16). The regioregularity calculated by a method using the abovementioned $^1$H-NMR was 68.3% and the weight-average molecular weight was 7100.

[Chemical Formula 14]

<Comparative Manufacturing Example 2>
Synthesis of poly(3-butoxy carbonyl-4-thiophene sulfonate) (Comparative P-2):

We carried out the same procedures as in Comparative Manufacturing Example 1 except that we used 41.27 parts of 3-thiophene butyl carbonate instead of 36.59 parts of 3-bromothiophene, we synthesized 5.47 parts of 3-butoxy carbonyl-4-thiophene sulfonate and obtained 3.58 parts (total yield of 8%) of poly (3-butoxy carbonyl-4-thiophene sulfonate (comparative P-2) having the thiophene repeating units (comparative E-2) indicated in formula (17). The regioregularity calculated using a method which used the abovementioned $^1$H-NMR was 69.2% and the weight-average molecular weight was 8300.

Furthermore, when we changed the 3-bromothiophene to 3-thiophene butyl carboxylate, we carried out operations which adjusted the amount of all of the raw materials so that the mol ratio of the reaction component and the non-reaction component (solvent and the like) was the same as in Comparative Manufacturing Example 1. This was carried out in the same way as for Comparative Manufacturing Example 3 as follows.

[Chemical Formula 15]

<Comparative Manufacturing Example 3>
Synthesis of poly(3-acetyl-4-thiophene sulfonate) (Comparative P-3):

We carried out the same procedures as in Comparative Manufacturing Example 1 except that we used 28.26 parts of 3-acetyl thiophene 28.26 [made by Tokyo Oka Kogyo (Ltd.)] instead of 36.59 parts of 3-bromothiophene, synthesized 5.21parts of 3-acetyl-4-thiophene sulfonate and obtained 2.84 parts of poly (3-acetyl-4-thiophene sulfonate) (comparative P-3) having the thiophene repeating units (comparative E-3) indicated in formula (18) (total yield of 9%). The regioregularity as calculated using a method using the abovementioned $^1$H-NMR was 65.2% and the weight-average molecular weight was 7600.

[Chemical Formula 16]

<Comparative Manufacturing Example 4>
Synthesis of poly(2-methoxy-5-aniline sulfonate):

We dissolved 20.32 parts of 2-amino anisol-4-sulfonate [made by Tokyo Oka Kogyo (Ltd.) in 30 parts (containing 10.12 parts of triethyl amine) in a 4M N,N-dimethyl aniline solution made up of water: acetonitrile=5:5 at 0° C. and dropped it while cooling in 10 parts of a 5:5 water-acetonitrile solution containing 22.82 parts of peroxoammonium disulfate. After the dropping was completed, we stirred it for 12 hour s at 25° C., then filtered the reaction product using a centrifuge filter device, washed it in a methyl alcohol solution of sulfuric acid and then dried it. We obtained 10 parts (yield of 50%) of the poly (2-methoxy-5-aniline sulfonate) indicated in formula (19).
[Chemical Formula 17]
Practical Examples 1 through 14; Comparative Examples 1 through 9
<Production of Conductive Composition for Solid Electrolyte Capacitor>

We mixed the substituted polythiophene (P) obtained in the abovementioned Manufacturing Examples 1 through 7 and Comparative Manufacturing Examples 1 through 4, basic compound (B), solvent (C), dispersant (Q) and dopant (E) in the weight ratio indicated in Table 1 and Table 2 and produced the conductive composition for solid electrolyte capacitor used respectively in Practical Examples 1 through 14 and in Comparative Examples 1 through 7. We used polystyrene sulfonate (PSS) [made by Aldrich]; polystyrene sulfonate soda (PSS ·Na) [from Toso Organic Chemicals (Ltd.) and sorbitan monolaurate [made by Wako Junyaku (Ltd.) for the dispersant (Q). We used poly (2-methoxy-5-aniline sulfonate) (made by PMAS) which is the sulfonated substituted polyaniline obtained in Comparative Manufacturing Example 4 for the conductive composition for the solid electrolyte capacitor used in Comparative Example 8. We used a [conductive polymer made by polymerization of PEDOT/PSS] [H,C, Baytron-P (made by Stalk Inc.); 3,4-ethylene oxythiophene (PEDOT) in high molecular weight polystyrene sulfonate (PSS) aqueous solution as is] which is known as a water dispersant element for polythiophene for the conductive composition for the solid electrolyte capacitor used for Comparative Example 9.

[Table 1]
[Table 2]
<Production of Conductive Coating>

We coated the abovementioned conductive composition for solid electrolyte capacitor on a slide glass (measuring 76 mm×26 mm; 1.0 mm thick) using a bar coater (No. 6). We dried it naturally for 0.5 hours at room temperature, then carried out heat treatment for 1 hour using an isothermic dryer and produced a conductive coating.
<Production of Solid Electrolyte Capacitor>
(1) Production of Dielectric Film on Anode We immersed aluminum etching foil (size: 4×3 3 mm) in a 3 weight % ammonium adipate aqueous solution. We raised this from OV to 40V at conditions of 0.53 mA/sec using a constant current, constant voltage source device. Then, we applied a constant voltage of 40 V for 40 minutes and subjected it to formation processing and formed a dielectric film made up of an oxidized film on the surface of the aluminum etching foil. We washed this for 10 minutes using a flow of deionized water, then carried out drying for 5 minutes at 105° C. and produced an anode made up of an anode metal and a dielectric film. We immersed the anode obtained in the abovementioned ammonium adipate aqueous solution, measured the electrostatic capacity at 120 Hz and made 4.2 μF which is that value the theoretical electrostatic capacity.

(2) Production of Solid Electrolyte Capacitor

We immersed the anode in the abovementioned conductive composition for solid electrolyte capacitor, lifted it up, let it dry naturally for 5 hours at room temperature. Then we heat-dried it for 1 hour using a 170° C. constant temperature dryer so that an electrolytic layer was formed and we produced an electrode for solid electrolyte capacitor.

(3) Production of Solid Electrolyte Capacitor

We coated a carbon paste [Banihite FU; made by Nippon Kokuen (Ltd.)] on top of the electrolyte layer obtained as indicated above, let it dry and formed a cathode. We pulled out the lead wire from the silver paste, connected the terminals and produced a solid electrolyte capacitor.

[Evaluation]

We evaluated the conductance and the heat resistance of the conductive coating, the leak current of the solid electrolyte capacitor, the dielectric withstanding voltage, the electrostatic capacity, the internal resistance and the heat resistance using the following evaluation method using the conductive coating and the solid electrolyte capacitor obtained. Results are indicated in Table 1 and Table 2.

Evaluation of Conductive Coating
<Evaluation of Conductance>

We measured the surface resistance of the conductive coating obtained above using the four terminal method using the Loresta GP TCP-T250 (made by Mitsubishi Chemical (Ltd.) and measured the thickness of the coating using a digital coating thickness meter DG-925 (made by Ono Sokki (Ltd.).

We calculated the initial dielectric constant using the following formula based on the surface resistance value and the coating thickness obtained by measuring.

Dielectric constant (S/cm)=1/{film thickness (cm)× surface resistance (Ω/□))

<Evaluation of Heat Resistance>

We heated the conductive coating whose surface resistance had been measured as indicated above for 240 hours continuously inside a 125° C. constant temperature dryer.

After heating, we set it aside to cool to room temperature, measured the surface resistance value after heating using the method indicated above and calculated the dielectric constant and calculated the dielectric constant retention after the heat resistance test using the following formula. This indicated that the greater the numerical value, the better the heat resistance of the conductive coating.

Dielectric constant retention (%)=(dielectric constant after heat resistance test/dielectric constant before heat resistance test)×100

Evaluation of Solid Electrolyte Capacitor
<Evaluation of Leaking Current>

We used the current immediately after the current was applied using 1.0V constant voltage mode using a direct current power source device [PMC18-1A; made by Kikusui Electronic Industries (Ltd.) as the leaking current for the solid electrolyte capacitor obtained as indicated above.

<Evaluation of Dielectric Withstanding Voltage>

We applied a voltage using a 0.2 mA constant current mode using a direct current power source device [PMC18-1A made by Kikusui Electronics Industries (Ltd.), the pressure was raised automatically and used the voltage immediately before the voltage dropped rapidly due to discharge as the dielectric withstanding voltage for the solid electrolyte capacitor obtained above.

<Evaluation of Electrostatic Capacity and Internal Resistance>

We connected an LCR high tester [3532-50; made by Nitchi Denki (Ltd.) to the solid electrolyte capacitor obtained above, measured the electrostatic capacity at a constant voltage level of 0.4 V and a frequency of 120 Hz and measured the internal resistance at a frequency of 100 kHz. Results are indicated in Table 1. The greater the numerical value of the electrostatic capacity, the better the impregnation characteristics of the conductive composition on the anode when the anode is immersed in the conductive composition for solid electrolyte capacitor.

<Evaluation of Heat Resistance>

We heated the solid electrolyte capacitor whose electrostatic capacity and internal resistance had been measured above continuously for 240 hours inside a 125° C. constant temperature dryer.

After heating, we set it aside to cool to room temperature and measured the electrostatic capacity and internal resistance after heating. We calculated the capacity retention and the internal resistance rate of change after the heat resistance test based on the following formula. The greater the numerical value for the capacity retention, the smaller the value for the internal resistance rate of change and the better the heat resistance of the solid electrolyte capacitor.

Capacity retention (%)=(electrostatic capacity after heat resistance test/initial electrostatic capacity)×100

Internal resistance rate of change (%)=(internal resistance after heat resistance test/initial internal resistance)×100

From Table 1 it can be seen that the conductive coating in Practical Examples 1 through 14 has superior heat resistance compared to the conductive coating in Comparative Examples 3 through 9.

The solid electrolyte capacitor in Practical Examples 1 through 14 has a superior solvent solubility or solvent dispersibility and better impregnation characteristics when compared to the solid electrolyte capacitor in Comparative Examples 3 through 9. As a result, it can be seen that the electrostatic capacity is high and the internal resistance is low.

The solid electrolyte capacitor in Practical Examples 12 through 14 contain the dispersant (Q) so that the dispersion characteristics of the substituted polythiophene (P) are improved so that the impregnation onto the anode is good, the capacitor capacity is drawn out efficiently and it has outstanding capacitor characteristics.

In addition, it can be seen that even when basic compound (B) is not used, the conductive coating and solid electrolyte capacitor in Practical Example 10 has conductive coating heat resistance which is superior to the conductive coating and the solid electrolyte capacitor in Comparative Examples 1, 5 and 9 and the capacitor characteristics are superior even after the heat resistance test. It can be seen that the conductive coating in Practical Examples 1 through 14 has a higher regioregularity for the substituted polythiophene (P) than the conductive coating in Comparative Examples 3 through 9 so that the conductance is high making it superior.

The conductive polymer for the solid electrolyte capacitor in the present invention has outstanding heat resistance for the conductive coating and has outstanding solubility or dispersibility in solvents so that the conductive composition for solid electrolyte capacitor made using these conductive polymers has good anode impregnation characteristics, it can draw out the capacitor capacity efficiently and has outstanding capacitor characteristics and has good capacitor characteristics in high-temperature environments.

INDUSTRIAL APPLICABILITY

The conductive polymer (A) for solid electrolyte capacitor in the present invention has outstanding solubility in solvents or dispersibility in solvents as well as outstanding heat resistance so that we can expect that it will be applied to a variety of conductive functional materials other than solid electrolyte capacitors. In addition, the solid electrolyte capacitor which uses the conductive polymer in the present invention has outstanding electrostatic capacity and heat resistance so that it can be applied to automobiles.

Chemical Formulas

[Chemical Formula 1]

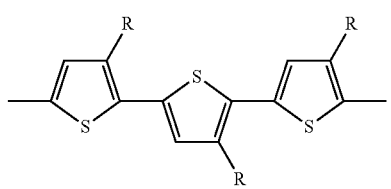

HT-HT combination (B1)

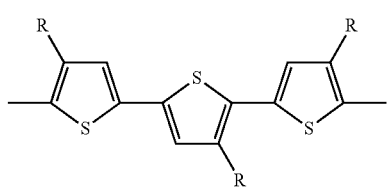

TT-HT combination (B2)

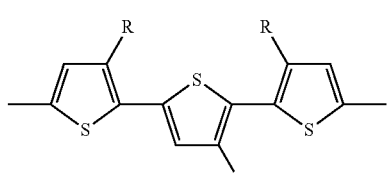

HT-HH combination (B3)

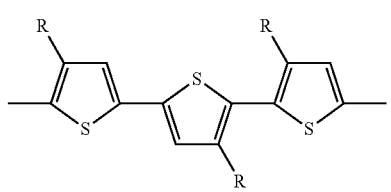

TT-HH combination (B4)

HT-HT Bond (B1)  TT-HT Bond (B2)
HT-HH Bond (B3)  TT-HH Bond (B4)

[Chemical Formula 2]

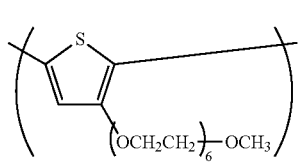

(4)

[Chemical Formula 3]

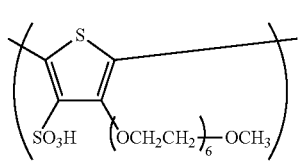

(5)

[Chemical Formula 4]
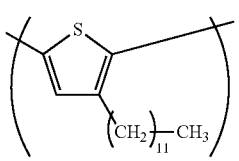
(6)
[Chemical Formula 5]
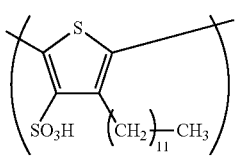
(7)
[Chemical Formula 6]
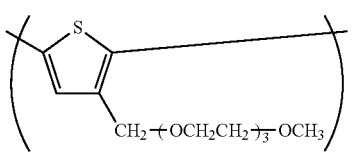
(8)
[Chemical Formula 7]
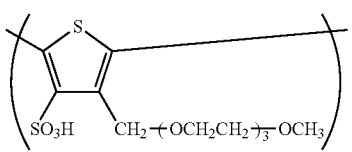
(9)
[Chemical Formula 8]
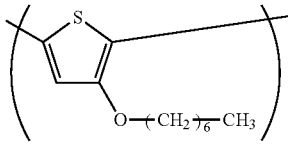
(10)
[Chemical Formula 9]
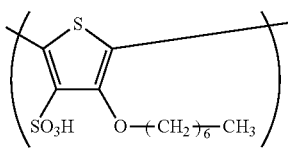
(11)
[Chemical Formula 10]
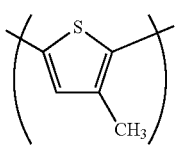
(12)
[Chemical Formula 11]
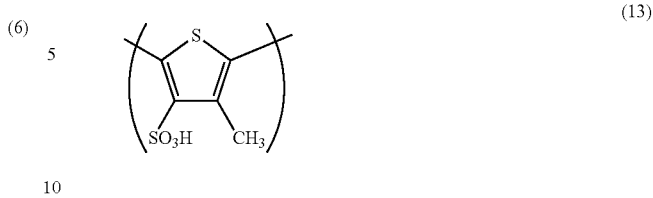
(13)
[Chemical Formula 12]
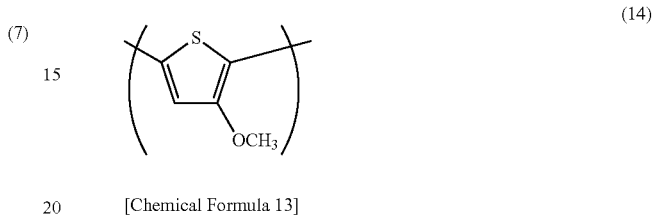
(14)
[Chemical Formula 13]
(15)
[Chemical Formula 14]
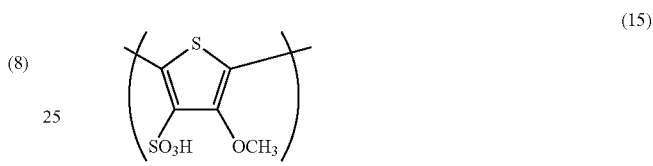
(16)
[Chemical Formula 15]
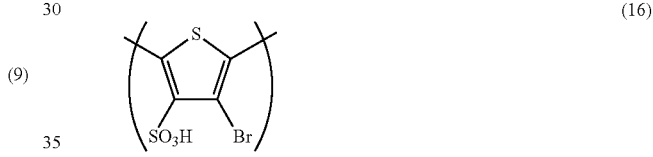
(17)
[Chemical Formula 16]
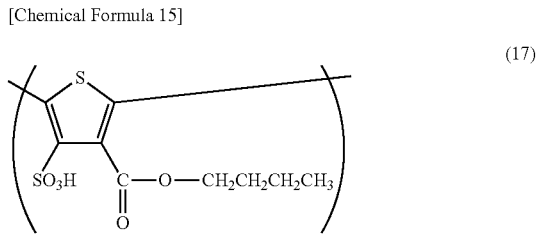
(18)
[Chemical Formula 17]
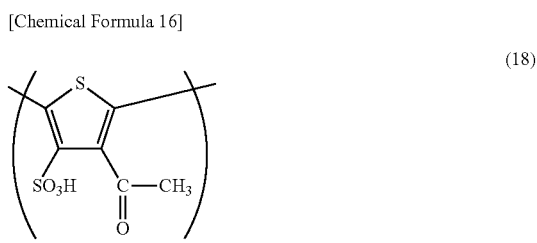
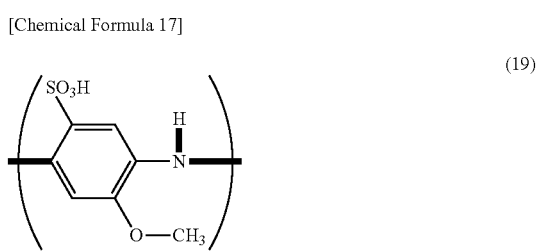
(19)

TABLE 1

|  |  |  | 1 Practical Example 1 | Practical Example 2 | Practical Example 3 | Practical Example 4 | Practical Example 5 |
|---|---|---|---|---|---|---|---|
| Compounding Percentage of Conductive Composition Component (Weight %) | Substituted Polythiophene (P) | Type | (P-1-1) | (P-1-1) | (P-1-1) | (P-2) | (P-3) |
|  |  | Repeating Units (D) | (D-1) | (D-1) | (D-1) | (D-2) | (D-3) |
|  |  | (D) Mol Ratio | 71 mol % | 71 mol % | 71 mol % | 78 mol % | 75 mol % |
|  |  | Repeating Units (E) | (E-1) | (E-1) | (E-1) | (E-2) | (E-3) |
|  |  | (E) Mol Ratio | 29 mol % | 29 mol % | 29 mol % | 22 mol % | 25 mol % |
|  |  | (P O) Mw | 32100 | 32100 | 32100 | 21400 | 22100 |
|  |  | Regioregularity (%) | 96.3% | 96.3% | 96.3% | 99.1% | 95.3% |
|  |  | Amount Used | 0.1% | 15.0% | 1.5% | 1.5% | 1.5% |
|  | PEDOT | Amount Used | — | — | — | — | — |
|  | Substituted Polyaniline | Type | — | — | — | — | — |
|  |  | Amount Used | — | — | — | — | — |
|  | Basic Compound (B) | Type | Ammonia | Ammonia | Ammonia | Ammonia | Ammonia |
|  |  | Amount Used | 0.2% | 15.0% | 1.5% | 1.5% | 1.5% |
|  | Solvent (C) | Type | Water | Water | Water | Water | Water |
|  |  | Amount Used | 99.7% | 70.0% | 97.0% | 97.0% | 97.0% |
|  | Dispersant (Q) | Type | — | — | — | — | — |
|  |  | Amount Used | — | — | — | — | — |
|  | (F) Dopant (F) | Type | — | — | — | — | — |
|  |  | Amount Used | — | — | — | — | — |
| Evaluation of Conductive Coating | | Surface Resistance (Ω/□) | 42 | 25 | 28 | 42 | 32 |
|  | | Film Thickness (μm) | 0.82 | 1.31 | 1.19 | 0.90 | 1.10 |
|  | | Conductance (S/cm) | 290 | 300 | 305 | 265 | 285 |
| Evaluation of Heat Resistance of Conductive Coating | | Conductance after Heat Resistance Test (S/cm) C. | 275 | 290 | 295 | 241 | 270 |
|  | | Conductivce Retention Rate (%) After Heat Resistance Test | 95% | 97% | 97% | 91% | 95% |
| Evaluation of Solid Electrolyte Capacitor | | Leaked Current (μA) | 0.08 | 0.07 | 0.08 | 0.10 | 0.09 |
|  | | Voltage Resistance (V) | 41 | 38 | 4 | 36 | 39 |
|  | | Electrostatic Capacity (μF) [120 Hz] | 3.96 | 4.10 | 4.06 | 3.84 | 3.94 |
|  | | internal Resistance (mΩ) [100 kHz] | 11.4 | 10.1 | 11.5 | 18.8 | 12.7 |
| Evaluation of Heat Resistance of Solid Electrolyte Capacitor | | Electrostatic Capacity after Heat Resistance Test (μF) [120 Hz] | 3.78 | 3.99 | 3.90 | 3.48 | 3.69 |
|  | | Internal Resistance after Heat Resistance Test (mΩ) [100 kHz] | 12.4 | 10.9 | 12.4 | 20.7 | 13.7 |
|  | | Electrostatic Capacity Retention Rate after Heat Resitance Tense (%) [120 Hz] | 95% | 97% | 96% | 91% | 94% |
|  | | Internal Resistance Rate of Change after Heat Resistance Test (%) [100 kHz] | 9% | 8% | 8% | 10% | 8% |

|  |  |  | Practical Example 6 | Practical Example 7 | Practical Example 8 | Practical Example 9 | Practical Example 10 |
|---|---|---|---|---|---|---|---|
| Compounding Percentage of Conductive Composition Component (Weight %) | Substituted Polythiophene (P) | Type | (P-4) | (P-5) | (P-6) | (P-1-1) | (P-1-1) |
|  |  | Repeating Units (D) | (D-4) | (D-5) | (D-6) | (D-1) | (D-1) |
|  |  | (D) Mol Ratio | 76 mol % | 72 mol % | 73 mol % | 71 mol % | 71 mol % |
|  |  | Repeating Units (E) | (E-4) | (E-5) | (E-6) | (E-1) | (E-1) |
|  |  | (E) Mol Ratio | 24 mol % | 28 mol % | 27 mol % | 29 mol % | 29 mol % |
|  |  | (P O) Mw | 16800 | 11200 | 11600 | 32100 | 32100 |
|  |  | Regioregularity (%) | 98.2% | 98.8% | 97.5% | 96.3% | 96.3% |
|  |  | Amount Used | 1.5% | 1.5% | 1.5% | 1.5% | 1.5% |
|  | PEDOT | Amount Used | — | — | — | — | — |
|  | Substituted Polyaniline | Type | — | — | — | — | — |
|  |  | Amount Used | — | — | — | — | — |
|  | Basic Compound (B) | Type | Ammonia | Ammonia | Ammonia | Triethyl Amine | — |
|  |  | Amount Used | 1.5% | 1.5% | 1.5% | 1.5% | — |
|  | Solvent (C) | Type | Water | Water | Water | Water | Water |
|  |  | Amount Used | 97.0% | 97.0% | 97.0% | 97.0% | 98.5% |
|  | Dispersant (Q) | Type | — | — | — | — | — |
|  |  | Amount Used | — | — | — | — | — |
|  | (F) Dopant (F) | Type | — | — | — | — | — |
|  |  | Amount Used | — | — | — | — | — |
| Evaluation of Conductive Coating | | Surface Resistance (Ω/□) | 41 | 43 | 42 | 25 | 34 |
|  | | Film Thickness (μm) | 0.91 | 0.92 | 0.93 | 1.28 | 0.90 |
|  | | Conductance (S/cm) | 268 | 253 | 256 | 310 | 325 |
| Evaluation of Heat Resistance of Conductive Coating | | Conductance after Heat Resistance Test (S/cm) C. | 247 | 218 | 223 | 295 | 315 |
|  | | Conductivce Retention Rate (%) After Heat Resistance Test | 92% | 86% | 87% | 95% | 97% |
| Evaluation of Solid Electrolyte Capacitor | | Leaked Current (μA) | 0.09 | 0.11 | 0.10 | 0.07 | 0.07 |
|  | | Voltage Resistance (V) | 37 | 34 | 35 | 41 | 40 |
|  | | Electrostatic Capacity (μF) [120 Hz] | 3.88 | 3.71 | 3.74 | 4.01 | 3.83 |
|  | | internal Resistance (mΩ) [100 kHz] | 17.4 | 23.1 | 22.9 | 11.3 | 13.2 |
| Evaluation of Heat | | Electrostatic Capacity after Heat Resistance Test (μF) [120 Hz] | 3.56 | 3.20 | 3.27 | 3.84 | 3.69 |

TABLE 1-continued

|  |  | Practical Example 11 | Practical Example 12 | Practical Example 13 | Practical Example 14 |
|---|---|---|---|---|---|
| Resistance of Solid Electrolyte Capacitor | Internal Resistance after Heat Resistance Test (mΩ) [100 kHz] | 19.2 | 26.2 | 25.7 | 12.3 | 14.0 |
|  | Electrostatic Capacity Retention Rate after Heat Resitance Tense (%) [120 Hz] | 92% | 86% | 87% | 96% | 96% |
|  | Internal Resistance Rate of Change after Heat Resistance Test (%) [100 kHz] | 10% | 13% | 12% | 9% | 6% |

|  |  |  | Practical Example 11 | Practical Example 12 | Practical Example 13 | Practical Example 14 |
|---|---|---|---|---|---|---|
| Compounding Percentage of Conductive Composition Component (Weight %) | Substituted Polythiophene (P) | Type | (P-1-1) | (P-1-2) | (P-1-2) | (P-1-2) |
|  |  | Repeating Units (D) | (D-1) | (D-1) | (D-1) | (D-1) |
|  |  | (D) Mol Ratio | 71 mol % | 71 mol % | 71 mol % | 71 mol % |
|  |  | Repeating Units (E) | (E-1) | (E-1) | (E-1) | (E-1) |
|  |  | (E) Mol Ratio | 29 mol % | 29 mol % | 29 mol % | 29 mol % |
|  |  | (P O) Mw | 32100 | 69200 | 69200 | 69200 |
|  |  | Regioregularity (%) | 96.3% | 96.3% | 96.3% | 96.3% |
|  |  | Amount Used | 1.5% | 1.5% | 1.5% | 1.5% |
|  | PEDOT | Amount Used | — | — | — | — |
|  | Substituted Polyaniline | Type | — | — | — | — |
|  |  | Amount Used | — | — | — | — |
|  | Basic Compound (B) | Type | Ammonia | Ammonia | Ammonia | Ammonia |
|  |  | Amount Used | 1.5% | 1.5% | 1.5% | 1.5% |
|  | Solvent (C) | Type | Methanol | Water | Water | Water |
|  |  | Amount Used | 97.0% | 95.5% | 95.5% | 95.5% |
|  | Dispersant (Q) | Type | — | PSS | PSS · Na | Sorbitan monolaurate |
|  |  | Amount Used | — | — | 1.5 | 1.5 |
|  | (F) Dopant (F) | Type | — | — | — | — |
|  |  | Amount Used | — | — | — | — |
| Evaluation of Conductive Coating | Surface Resistance (Ω/□) |  | 25 | 24 | 25 | 23 |
|  | Film Thickness (μm) |  | 1.23 | 1.28 | 1.25 | 1.19 |
|  | Conductance (S/cm) |  | 320 | 326 | 320 | 365 |
| Evaluation of Heat Resistance of Conductive Coating | Conductance after Heat Resistance Test (S/cm) C. |  | 310 | 321 | 312 | 358 |
|  | Conductive Retention Rate (%) After Heat Resistance Test |  | 97% | 99% | 98% | 98% |
| Evaluation of Solid Electrolyte Capacitor | Leaked Current (μA) |  | 0.11 | 0.08 | 0.08 | 0.07 |
|  | Voltage Resistance (V) |  | 39 | 45 | 43 | 45 |
|  | Electrostatic Capacity (μF) [120 Hz] |  | 4.18 | 4.06 | 4.06 | 4.07 |
|  | internal Resistance (mΩ) [100 kHz] |  | 9.1 | 8.8 | 9.1 | 8.3 |
| Evaluation of Heat Resistance of Solid Electrolyte Capacitor | Electrostatic Capacity after Heat Resistance Test (μF) [120 Hz] |  | 4.05 | 4.03 | 3.94 | 3.98 |
|  | Internal Resistance after Heat Resistance Test (mΩ) [100 kHz] |  | 9.6 | 9.4 | 9.8 | 8.9 |
|  | Electrostatic Capacity Retention Rate after Heat Resitance Tense (%) [120 Hz] |  | 97% | 99% | 97% | 98% |
|  | Internal Resistance Rate of Change after Heat Resistance Test (%) [100 kHz] |  | 5% | 7% | 8% | 7% |

TABLE 2

|  |  |  | Comparative Example 1 | Comparative Example 2 | Comparative Example 3 |
|---|---|---|---|---|---|
| Compounding Percentage of Conductive Composition Components (weight %) | Substituted polythiophene (P) | Type | (PO-1) | (PO-1) | (Comparative P-1) |
|  |  | D) Repeating Units (D) | (D-1) | (D-1) | — |
|  |  | (D) Mol Ratio | 100 mol % | 100 mol % | — |
|  |  | Repeating Units (E) | — | — | (Comparative E-1) |
|  |  | (E) Mol Ratio | — | — | 100 mol % |
|  |  | (PO) Mw | 32100 | 32100 | 7100 |
|  |  | Regioregularity (%) | 96.3% | 96.3% | 68.3% |
|  |  | Amount Used | 1.5% | 1.5% | 1.5% |
|  | PEDOT | Amount Used | — | — | — |
|  | Substituted Polyaniline | Type | — | — | — |
|  |  | Amount Used | — | — | — |
|  | Basic Compound (B) | Type | — | Ammonia | Ammonia |
|  |  | Amount Used | — | 1.5% | 1.5% |
|  | Solvent C | Type | methanol | Methanol | Water |
|  |  | Amount Used | 98.0% | 96.5% | 97.0% |
|  | Dispersant (Q) | Type | — | — | — |
|  |  | Amount Used | — | — | — |
|  | Dopant (F) | Type | Sulfuric Acid | Sulfuric Acid | — |
|  |  | Amount Used | 0.5% | 0.5% | — |

TABLE 2-continued

|  |  |  |  |  |
|---|---|---|---|---|
| Evaluation of Conductive Coating | Surface Resistance (Ω/□) | 41 | 36 | 521 |
|  | Film Thickness (μm) | 0.93 | 1.10 | 1.20 |
|  | Conductance S/cm) | 260 | 250 | 16 |
| Evaluation of Heat Resistance of Conductive Coating | Conductance after heat Resistance Test (S/cm) | 195 | 180 | 13 |
|  | Conductance Retention After Heat Resistance Test (%) | 75% | 72% | 81% |
| Evaluation of Solid Electrolyte Capacitor | Leaked Current (μA) | 0.21 | 0.20 | 0.32 |
|  | Dielectric Withstanding Voltage (V) | 30 | 28 | 12 |
|  | Electrostatic Capacity (μF) [120 Hz] | 3.55 | 3.64 | 0.47 |
|  | Internal resistance (mΩ) [100 kHz] | 38.8 | 40.2 | 96.3 |
| Evaluation of Heat Resistance of Solid Electrolyte Capacitor | Electrostatic Capacity After Heat Resistance Test (μF) [120 Hz] | 3.05 | 3.14 | 0.37 |
|  | Internal Resistance After Heat Resistance Test (mΩ) [100 kHz] | 45.6 | 47.0 | 118.2 |
|  | Electrostatic Capacity Retention After Heat Resistance Test (%) [120 Hz] | 86% | 86% | 79% |
|  | Internal Resistance Rate of Change After Heat Resistance Test (%) [100 kHz] | 18% | 17% | 23% |

|  |  |  | Comparative Example 4 | Comparative Example 5 | Comparative Example 6 |
|---|---|---|---|---|---|
| Compounding Percentage of Conductive Composition Components (weight %) | Substituted polythiophene (P) | Type | (Comparative P-1) | (Comparative P-1) | (Comparative P-2) |
|  |  | D) Repeating Units (D) | — | — | — |
|  |  | (D) Mol Ratio | — | — | — |
|  |  | Repeating Units (E) | (Comparative E-1) | (Comparative E-1) | (Comparative E-2) |
|  |  | (E) Mol Ratio | 100 mol % | 100 mol % | 100 mol % |
|  |  | (PO) Mw | 7100 | 7100 | 8300 |
|  |  | Regioregularity (%) | 68.3% | 70.3% | 69.2% |
|  |  | Amount Used | 1.5% | 1.5% | 1.5% |
|  | PEDOT | Amount Used | — | — | — |
|  | Substituted Polyaniline | Type | — | — | — |
|  |  | Amount Used | — | — | — |
|  | Basic Compound (B) | Type | Ammonia | — | Ammonia |
|  |  | Amount Used | 0.2% | — | 0.2% |
|  | Solvent C | Type | water | water | water |
|  |  | Amount Used | 98.3% | 98.5% | 98.3% |
|  | Dispersant (Q) | Type | — | — | — |
|  |  | Amount Used | — | — | — |
|  | Dopant (F) | Type | — | — | — |
|  |  | Amount Used | — | — | — |
| Evaluation of Conductive Coating | Surface Resistance (Ω/□) | | 606 | 833 | 621 |
|  | Film Thickness (μm) | | 1.10 | 1.20 | 1.15 |
|  | Conductance S/cm) | | 15 | 10 | 14 |
| Evaluation of Heat Resistance of Conductive Coating | Conductance after heat Resistance Test (S/cm) | | 12 | 7 | 11 |
|  | Conductance Retention After Heat Resistance Test (%) | | 80% | 70% | 79% |
| Evaluation of Solid Electrolyte Capacitor | Leaked Current (μA) | | 0.31 | 0.37 | 0.31 |
|  | Dielectric Withstanding Voltage (V) | | 13 | 11 | 13 |
|  | Electrostatic Capacity (μF) [120 Hz] | | 0.53 | 0.21 | 0.51 |
|  | Internal resistance (mΩ) [100 kHz] | | 98.0 | 120.0 | 92.2 |
| Evaluation of Heat Resistance of Solid Electrolyte Capacitor | Electrostatic Capacity After Heat Resistance Test (μF) [120 Hz] | | 0.43 | 0.14 | 0.41 |
|  | Internal Resistance After Heat Resistance Test (mΩ) [100 kHz] | | 122.1 | 166.3 | 114.3 |
|  | Electrostatic Capacity Retention After Heat Resistance Test (%) [120 Hz] | | 81% | 67% | 80% |
|  | Internal Resistance Rate of Change After Heat Resistance Test (%) [100 kHz] | | 24% | 39% | 24% |

|  |  |  | Comparative Example 7 | Comparative Example 8 | Comparative Example 9 |
|---|---|---|---|---|---|
| Compounding Percentage of Conductive Composition Components (weight %) | Substituted polythiophene (P) | Type | (Comparative P-3) | — | — |
|  |  | D) Repeating Units (D) | — | — | — |
|  |  | (D) Mol Ratio | — | — | — |
|  |  | Repeating Units (E) | (Comparative E-3) | — | — |
|  |  | (E) Mol Ratio | 100 mol % | — | — |
|  |  | (PO) Mw | 7600 | — | — |
|  |  | Regioregularity (%) | 65.2% | — | — |
|  |  | Amount Used | 1.5% | — | — |
|  | PEDOT | Amount Used | — | — | 0.7% |
|  | Substituted Polyaniline | Type | — | PMAS | — |
|  |  | Amount Used | — | 1.5% | — |
|  | Basic Compound (B) | Type | Ammonia | Ammonia | — |
|  |  | Amount Used | 0.2% | 0.2% | — |
|  | Solvent C | Type | water | water | water |
|  |  | Amount Used | 98.3% | 98.3% | 97.6% |

TABLE 2-continued

|  |  |  |  |  |
|---|---|---|---|---|
|  | Dispersant (Q) Type | — | — | — |
|  | Amount Used | — | — | — |
|  | Dopant (F) Type | — | — | PSS |
|  | Amount Used | — | — | 1.7% |
| Evaluation of Conductive Coating | Surface Resistance (Ω/□) | 601 | 46382 | 87 |
|  | Film Thickness (μm) | 1.11 | 1.54 | 1.32 |
|  | Conductance S/cm) | 15 | 0.14 | 87 |
| Evaluation of Heat Resistance of Conductive Coating | Conductance after heat Resistance Test (S/cm) | 12 | 0.07 | 62 |
|  | Conductance Retention After Heat Resistance Test (%) | 80% | 51% | 71% |
| Evaluation of Solid Electrolyte Capacitor | Leaked Current (μA) | 0.33 | 0.29 | 0.28 |
|  | Dielectric Withstanding Voltage (V) | 11 | 9 | 17 |
|  | Electrostatic Capacity (μF) [120 Hz] | 0.48 | 1.95 | 1.82 |
|  | Internal resistance (mΩ) [100 kHz] | 97.7 | 652.4 | 73.2 |
| Evaluation of Heat Resistance of Solid Electrolyte Capacitor | Electrostatic Capacity After Heat Resistance Test (μF) [120 Hz] | 0.38 | 1.02 | 1.51 |
|  | Internal Resistance After Heat Resistance Test (mΩ) [100 kHz] | 120.1 | 963.8 | 88.0 |
|  | Electrostatic Capacity Retention After Heat Resistance Test (%) [120 Hz] | 79% | 52% | 83% |
|  | Internal Resistance Rate of Change After Heat Resistance Test (%) [100 kHz] | 23% | 48% | 20% |

The invention claimed is:

1. A conductive composition for a solid electrolyte capacitor comprising a conductive polymer (A) for the solid electrolyte capacitor; a basic compound (B); and a solvent (C);
wherein the conductive polymer (A) for the solid electrolyte capacitor contains substituted polythiophene (P) comprising thiophene repeating units (D) wherein the hydrogen atoms at position 3 and/or position 4 of the thiophene ring of the repeat unit are substituted by at least one type of group (s) selected from a group made up of:
(a) a polyether group (a) indicated by the following general formula (1):

—(OR$^1$)$_k$—OR$^2$     (1)

where OR$^1$ is an oxyalkylene having 2 to 4 carbon atoms; R$^2$ is an alkyl group having 1 to 15 carbon atoms; and k is an integer from 1 to 9;
(b) an alkoxy group (b) having 1 to 15 carbon atoms;
(c) an alkoxy alkyl group (c) indicated by the following general formula (2):

—R$^3$—OR$^4$     (2)

where R$^3$ is a straight-chain or branching alkylene group having 1 to 4 carbon atoms; R$^4$ is a straight-chain or branching alkyl group with 1 to 15 carbon atoms;]
(d) an alkyl group (d) having 1 to 15 carbon atoms; and
(e) a group (e) indicated by general formula (3):

—R$^5$—(OR$^6$)$_m$—OR$^7$     (3)

where R$^5$ is straight-chain or branching alkylene group having 1 to 4 carbon atoms; OR$^6$ is an oxyalkylene group having 2 to 4 carbon atoms; R$^7$ is an alkyl group having 1 to 15 carbon atoms; m is an integer from 1 to 9; and
thiophene repeating units (E) wherein the hydrogen atoms at position 3 and/or position 4 of the thiophene ring are substituted by the group (s) and a sulfonate group (f).

2. The composition of claim 1, wherein the amount of (A) relative to the solid electrolyte capacitor conductive polymer (A); basic compound (B); and solvent (C) is 0.01 to 15 weight %.

3. The composition of claim 1, wherein the composition further comprises a dispersant (Q).

4. The composition of claim 3, wherein the amount of (A) relative to the solid electrolyte capacitor conductive polymer (A); basic compound (B); and solvent (C); and dispersant (Q) is 0.01 to 15 weight %.

5. The composition of claim 3, wherein the composition further comprises a dopant (F) which is not repeat unit E.

6. The composition of claim 1, wherein the group (s) is selected from (a) and not from (b), (c), (d), and (e).

7. The composition of claim 1, wherein the group (s) is selected from (b) and not from (a), (c), (d), and (e).

8. The composition of claim 1, wherein the group (s) is selected from (c) and not from (a), (b), (d), and (e).

9. The composition of claim 1, wherein the group (s) is selected from (d) and not from (a), (b), (c), and (e).

10. The composition of claim 1, wherein the group (s) is selected from (e) and not from (a), (b), (c), and (d).

11. A solid electrolyte capacitor electrode prepared by coating a film from the composition of claim 1 on a porous substrate.

12. A solid electrolyte capacitor comprising an electrode according to claim 11.

13. A solid electrolyte capacitor electrode prepared by coating a film from the composition of claim 3 on a porous substrate.

14. A solid electrolyte capacitor comprising an electrode according to claim 13.

15. A solid electrolyte capacitor electrode prepared by coating a film from the composition of claim 5 on a porous substrate.

16. A solid electrolyte capacitor comprising an electrode according to claim 15.

17. A solid electrolyte capacitor electrode comprising a film comprising conductive polymer (A); a basic compound (B); and a dispersant (Q); on a porous substrate;
wherein the conductive polymer (A) for the solid electrolyte capacitor contains substituted polythiophene (P) comprising thiophene repeating units (D) wherein the hydrogen atoms at position 3 and/or position 4 of the thiophene ring of the repeat unit are substituted by at least one type of group (s) selected from a group made up of:
(a) a polyether group (a) indicated by the following general formula (1):

—(OR$^1$)$_k$—OR$^2$     (1)

where $OR^1$ is an oxyalkylene having 2 to 4 carbon atoms; $R^2$ is an alkyl group having 1 to 15 carbon atoms; and k is an integer from 1 to 9;

(b) an alkoxy group (b) having 1 to 15 carbon atoms;

(c) an alkoxy alkyl group (c) indicated by the following general formula (2):

$$—R^3—OR^4 \qquad (2)$$

where $R^3$ is a straight-chain or branching alkylene group having 1 to 4 carbon atoms; $R^4$ is a straight-chain or branching alkyl group with 1 to 15 carbon atoms;]

(d) an alkyl group (d) having 1 to 15 carbon atoms; and (e) a group (e) indicated by general formula (3):

$$—R^5—(OR^6)_m—OR^7 \qquad (3)$$

where $R^5$ is straight-chain or branching alkylene group having 1 to 4 carbon atoms; $OR^6$ is an oxyalkylene group having 2 to 4 carbon atoms; $R^7$ is an alkyl group having 1 to 15 carbon atoms; m is an integer from 1 to 9; and thiophene repeating units (E) wherein the hydrogen atoms at position 3 and/or position 4 of the thiophene ring are substituted by the group (s) and a sulfonate group (f).

18. The solid electrolyte capacitor electrode according to claim 17, wherein the film has a film thickness of 0.05 microns to 100 microns.

19. The solid electrolyte capacitor comprising the electrode of claim 18.

20. A solid electrolyte capacitor comprising an electrode comprising a film comprising conductive polymer (A); and a basic compound (B); and a dispersant (Q); on a porous substrate;

wherein the conductive polymer (A) for the solid electrolyte capacitor contains substituted polythiophene (P) wherein the hydrogen atoms at position 3 and/or position 4 of a thiophene ring have thiophene repeating units (D) which have been substituted by at least one type of group (s) selected from a group made up of:

(a) a polyether group (a) indicated by the following general formula (1):

$$—(OR^1)_k—OR^2 \qquad (1)$$

where $OR^1$ is an oxyalkylene having 2 to 4 carbon atoms; $R^2$ is an alkyl group having 1 to 15 carbon atoms; and k is an integer from 1 to 9;

(b) an alkoxy group (b) having 1 to 15 carbon atoms;

(c) an alkoxy alkyl group (c) indicated by the following general formula (2):

$$—R^3—OR^4 \qquad (2)$$

where $R^3$ is a straight-chain or branching alkylene group having 1 to 4 carbon atoms; $R^4$ is a straight-chain or branching alkyl group with 1 to 15 carbon atoms;]

(d) an alkyl group (d) having 1 to 15 carbon atoms; and (e) a group (e) indicated by general formula (3):

$$—R^5—(OR^6)_m—OR^7 \qquad (3)$$

where $R^5$ is straight-chain or branching alkylene group having 1 to 4 carbon atoms; $OR^6$ is an oxyalkylene group having 2 to 4 carbon atoms; $R^7$ is an alkyl group having 1 to 15 carbon atoms; m is an integer from 1 to 9; and thiophene repeating units (E) wherein the hydrogen atoms at position 3 and/or position 4 of the thiophene ring are substituted by the group (s) and a sulfonate group (f).

* * * * *